US012812396B2

(12) United States Patent
Nayak et al.

(10) Patent No.: US 12,812,396 B2
(45) Date of Patent: Nov. 24, 2026

(54) COEXISTENCE MANAGEMENT FOR WI-FI NETWORKS

(71) Applicant: Samsung Electronics Co., Ltd., Suwon-si (KR)

(72) Inventors: Peshal Nayak, Plano, TX (US); Boon Loong Ng, Plano, TX (US); Rubayet Shafin, Allen, TX (US); Vishnu Vardhan Ratnam, Plano, TX (US); Yue Qi, Plano, TX (US); Elliot Jen, Taipei City (TW)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 18/652,656

(22) Filed: May 1, 2024

(65) Prior Publication Data

US 2024/0373242 A1 Nov. 7, 2024

Related U.S. Application Data

(60) Provisional application No. 63/570,566, filed on Mar. 27, 2024, provisional application No. 63/526,165,
(Continued)

(51) Int. Cl.
*H04W 16/14* (2009.01)
*H04W 52/02* (2009.01)
*H04W 84/12* (2009.01)

(52) U.S. Cl.
CPC ....... *H04W 16/14* (2013.01); *H04W 52/0216* (2013.01); *H04W 84/12* (2013.01)

(58) Field of Classification Search
None
See application file for complete search history.

(56) References Cited

U.S. PATENT DOCUMENTS 9,433,011 B2 8/2016 Hwang et al.
9,743,440 B2 8/2017 Wietfeldt et al.
(Continued)

FOREIGN PATENT DOCUMENTS

CN 110740465 A 1/2020
WO 2022220370 A1 10/2022

OTHER PUBLICATIONS

International Search Report and Written Opinion issued Aug. 7, 2024 regarding International Application No. PCT/KR2024/005997, 8 pages.
(Continued)

*Primary Examiner* — Jenkey Van

(57) ABSTRACT

Methods and apparatuses for facilitating mitigation of coexistence effects on wireless fidelity (WI-FI) transmission or reception by co-located non-WI-FI technology radios or peer-to-peer (P2P) WI-FI transmissions in a wireless communication device. A method performed by a first wireless communication device comprises generating a message that includes information on a coexistence constraint on WI-FI transmission or reception by the first device, wherein the coexistence constraint is related to interference from other wireless communication protocol hardware in the first device or P2P WI-FI transmissions involving the first device. The method further comprises transmitting the message to at least one second wireless communication device associated with the first device.

12 Claims, 21 Drawing Sheets

Related U.S. Application Data filed on Jul. 11, 2023, provisional application No. 63/464,372, filed on May 5, 2023.

(56) References Cited

U.S. PATENT DOCUMENTS

| | | | | |
|---|---|---|---|---|
| 9,872,338 | B2 | 1/2018 | Jechoux et al. | |
| 11,627,526 | B2 | 4/2023 | Cherian et al. | |
| 2021/0204140 | A1* | 7/2021 | Ghosh | H04L 1/0068 |
| 2022/0353875 | A1 | 11/2022 | Jiang | |
| 2023/0017748 | A1 | 1/2023 | Al Jurdi et al. | |
| 2023/0239788 | A1* | 7/2023 | Kim | H04W 52/0216 370/311 |
| 2023/0319711 | A1* | 10/2023 | Uppala | H04W 52/0216 370/311 |
| 2023/0354299 | A1* | 11/2023 | Kneckt | H04W 28/0278 |
| 2024/0015597 | A1 | 1/2024 | Choi et al. | |
| 2024/0022383 | A1* | 1/2024 | Fang | H04L 5/0053 |
| 2024/0163916 | A1* | 5/2024 | Ryu | H04W 74/0866 |

OTHER PUBLICATIONS

IEEE P802.11be-D3.0 "Part 11: Wireless LAN Medium Access Control (MAC) and Physical Layer (PHY) Specifications—Amendment 8: Enhancements for extremely high throughput (EHT)"Jan. 2023, 999 pages.

IEEE Standards Association; IEEE Std 802.11-2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

IEEE P802.11be-D2.0 "Part 11: Wireless LAN Medium Access Control (MAC) and Physical Layer (PHY) Specifications—Amendment 8: Enhancements for extremely high throughput (EHT)" May 2022, 873 pages.

Supplementary European Search Report dated Apr. 7, 2026, in connection with European Patent Application No. 24803661.8, 6 pages.

* cited by examiner

1200

| Element ID | Length | Quiet count | Quiet Period | Quiet Duration | Quiet Offset | Direction | STA identifier |
|---|---|---|---|---|---|---|---|
| Octet: 1 | 1 | 1 | 1 | 2 | 2 | 1 | variable |

COEXISTENCE MANAGEMENT FOR WI-FI NETWORKS

CROSS-REFERENCE TO RELATED APPLICATION AND CLAIM OF PRIORITY

This application claims priority under 35 U.S.C. § 119(e) to U.S. Provisional Patent Application No. 63/464,372 filed on May 5, 2023, U.S. Provisional Patent Application No. 63/526,165 filed on Jul. 11, 2023, and U.S. Provisional Patent Application No. 63/570,566 filed on Mar. 27, 2024, which are hereby incorporated by reference in their entirety.

TECHNICAL FIELD

This disclosure relates generally to interference management in wireless communications systems. Embodiments of this disclosure relate to methods and apparatuses that manage coexistence interference between in a wireless local area network communications system.

BACKGROUND

Wireless local area network (WLAN) technology allows devices to access the internet in the 2.4 gigahertz (GHz), 5 GHz, 6 GHZ, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus, both the AP and non-AP device may be capable of communicating on different bands/links, which is referred to as multi-link operation (MLO). The WI-FI (wireless fidelity) devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD. The component of an MLD that is responsible for transmission and reception on one link is referred to as a station (STA).

Target wake time (TWT) is one of the most important features for power management in WI-FI networks, which was developed by IEEE 802.11ah and later adopted and modified into IEEE 802.11ax. TWT allows an AP to manage activity in the BSS (basic service set) to minimize contention between STAs and reduce the required amount of time that a STA utilizing a power management mode needs to be awake. This is achieved by allocating STAs to operate at nonoverlapping times and/or frequencies and concentrating the frame exchange sequences in predefined service periods. With TWT operation, it suffices for a STA to only wake up at a pre-scheduled time negotiated with another STA or AP in the network. A STA does not need to be aware of the values of TWT parameters of the TWT agreements of other STAs in the BSS of the STA or of TWT agreements of STAs in other BSSs. A STA does not need to be aware that a TWT service period (SP) is used to exchange frames with other STAs. Frames transmitted during a TWT SP are carried in any PPDU format supported by the pair of STAs that have established the TWT agreement corresponding to that TWT SP, including HE MU PPDU, HE TB PPDU, etc.

In IEEE 802.11 standards, two types of TWT operation are possible-individual TWT operation and broadcast TWT operation. Individual TWT agreements can be established between two STAs or between a STA and an AP. The negotiation that takes place for an individual TWT agreement between two STAs is on an individual basis. The AP can have TWT agreements with multiple STAs. Any changes in the TWT agreement between the AP and one STA do not affect the TWT agreement between the AP and the other STA.

IEEE 802.11ax first introduced the broadcast TWT (bTWT or B-TWT) operation. The broadcast TWT operates in a membership-based approach. With broadcast TWT operation, an AP can set up a shared TWT session for a group of STAs. The AP is typically the controller of the broadcast TWT schedule. The non-AP STAs in the BSS can request membership in the schedule, or the AP can send an unsolicited response to the STA to make the STA a member of the broadcast TWT schedule the AP maintains in the BSS. The AP can advertise/announce and maintain multiple broadcast TWT schedules in the network. When a change is made to any of the schedules in the network, it affects all the STAs that are members of that particular schedule.

BLUETOOTH is a wireless technology that started off as a short-distance cable replacement mechanism. BLUETOOTH classic, which is used for streaming applications (e.g., headsets), operates on 79 RF channels each spaced 1 MHz apart. BLUETOOTH low energy (BLE) on the other hand, which is used for IoT applications, operates on 40 RF channels each spaced 2 MHz apart. In the case of BLUETOOTH, some channels are reserved specifically for the purpose of advertisement and others are used for secondary advertisement for data transmission. In the case of BLUETOOTH classic, 32 channels are reserved for advertisement whereas in the case of BLE 3 channels are reserved for advertisement.

In BLUETOOTH, transmissions happen as a part of a connection event. During a connection event, two devices that are engaged in data transmission alternate sending data until the data to be sent on both sides is exhausted. One of the devices acts as the master and the other device acts as the slave. The master sends a packet to the slave and if the slave receives the packet it sends back a packet to the master. The duration between two connection events is called a connection interval. Connection interval values can range from 7.5 ms to 4 s. The exact value can be negotiated between the master and the slave to optimize their power saving while balancing latency incurred. BLUETOOTH transmissions follow frequency hopping spread spectrum method where a hopping sequence is used to rapidly hop between data channels.

SUMMARY

Embodiments of the present disclosure provide methods and apparatuses that facilitate mitigation of coexistence effects on WI-FI transmission or reception by co-located non-WI-FI technology radios or peer-to-peer (P2P) WI-FI transmissions in a wireless communication device.

In one embodiment, a method performed by a first wireless communication device comprises generating a message that includes information on a coexistence constraint on WI-FI transmission or reception by the first device, wherein the coexistence constraint is related to interference from other wireless communication protocol hardware in the first device or peer-to-peer (P2P) WI-FI transmissions involving the first device. The method further comprises transmitting the message to at least one second wireless communication device associated with the first device.

In another embodiment, a first wireless communication device comprises a WI-FI transceiver, other wireless communication protocol hardware, and a processor operably coupled to the WI-FI transceiver and the other wireless communication protocol hardware. The processor is configured to generate a message that includes information on a coexistence constraint on WI-FI transmission or reception by the first device, wherein the coexistence constraint is related to interference from the other wireless communication protocol hardware in the first device or P2P WI-FI transmissions involving the first device. The WI-FI transceiver is configured to transmit the message to at least one second wireless communication device associated with the first device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term “couple” and its derivatives refer to any direct or indirect communication between two or more elements, whether or not those elements are in physical contact with one another. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system or part thereof that controls at least one operation. Such a controller may be implemented in hardware or a combination of hardware and software and/or firmware. The functionality associated with any particular controller may be centralized or distributed, whether locally or remotely. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C. As used herein, such terms as “1st” and “2nd,” or “first” and “second” may be used to simply distinguish a corresponding component from another and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
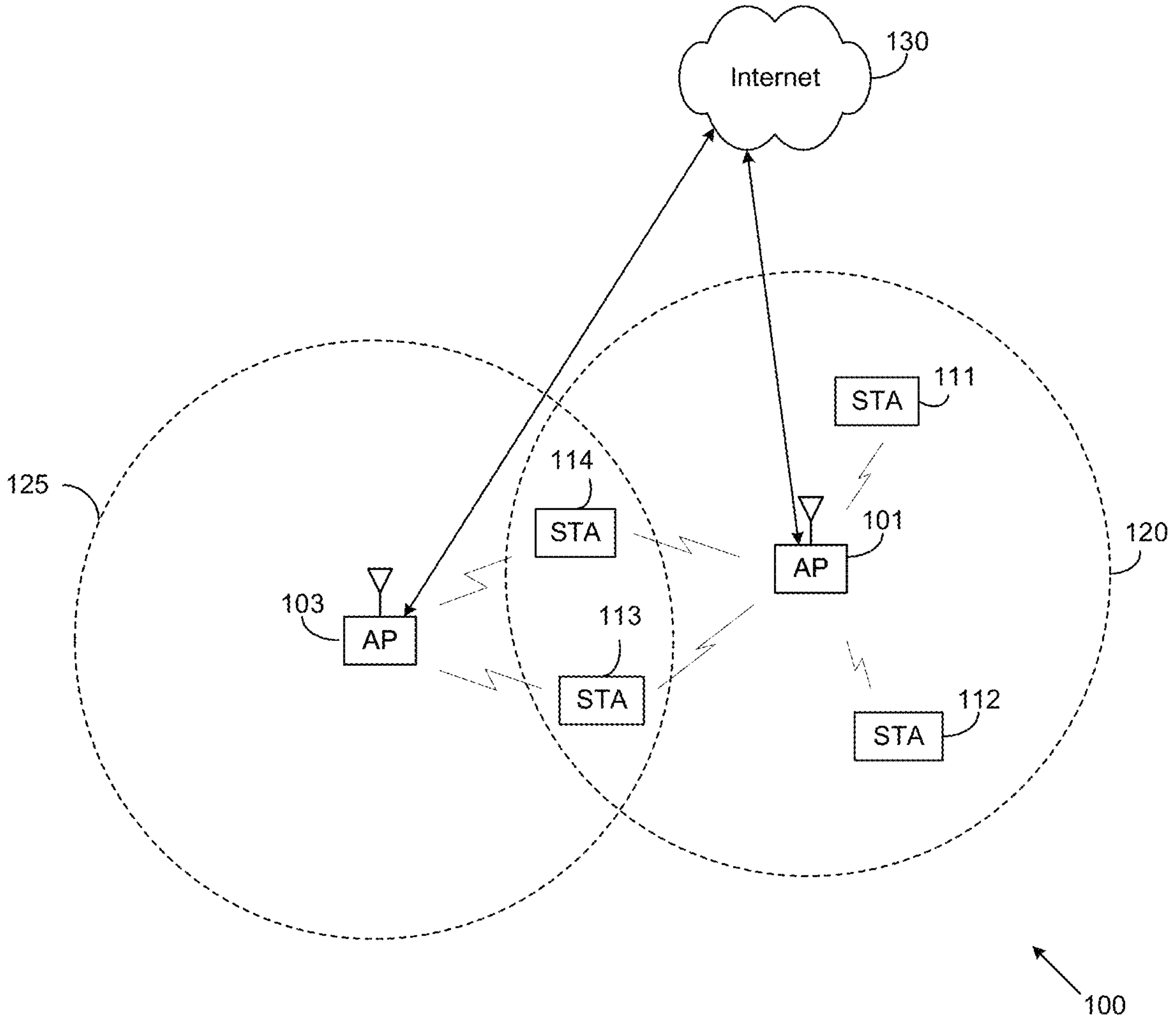
FIG. 1 illustrates an example wireless network according to various embodiments of the present disclosure.

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that as BLUETOOTH and WI-FI follow different channel access protocols, coexistence of BLUETOOTH with WI-FI in a wireless device can lead to interference with WI-FI transmissions. Some BLUETOOTH transmissions can be scheduled, making the interference more predictable. However, in other cases, BLUETOOTH interference can be hard to predict in advance. Thus WI-FI needs to have mechanisms to react to BLUETOOTH interference when it occurs in such cases.

Embodiments of the present disclosure further recognize that BLUETOOTH is used for a large number of applications such as streaming applications, sensor applications, way finding based on beaconing, etc. WI-FI routers from a few vendors also come equipped with BLUETOOTH radios for the purpose of way finding/location awareness applications. Further, an end user's phone can be configured as a Mobile AP which can also have BLUETOOTH operating on it. BLUETOOTH has primarily operated on the 2.4 GHz band. However, in next generation BLUETOOTH technology, the operation is expected to be extended to 5 GHz and 6 GHz band as well. Thus, the interference problem can be worse for WI-FI operation which also uses these bands for communication.

Embodiments of the present disclosure further recognize that Ultra-Wide Band (UWB) has recently become popular for use cases involving indoor positioning and navigation using the 6 GHz band.

Embodiments of the present disclosure further recognize that ZIGBEE protocol is another technology developed for smart home applications. The ZIGBEE protocol can operate in the 2.4 GHz band.

As noted herein, IEEE 802.11be introduced multi-link operation as a means to enhance device performance. MLO operation currently leverages the three bands of operation in WI-FI which are 2.4 GHz, 5 GHZ, and 6 GHz band. A mobile AP MLD is a special type of AP MLD which can be a battery powered device. Mobile AP MLD has two links-one link is the primary link, and the second link is the non-primary link. Mobile AP MLD needs to follow an additional constraint in its operation which is the tight synchronization between the transmission and reception on the primary and non-primary link. The AP STA affiliated with the Mobile AP MLD can initiate a PPDU transmission to its associated non-AP STA of the non-AP MLD on the non-primary link only if the STA affiliated with the same MLD on the primary link is also initiating a PPDU as a TXOP holder with the same start time. The same constraint has to be followed on the non-AP MLD side for a non-AP MLD associated with a Mobile AP MLD.

Embodiments of the present disclosure further recognize that for a number of the applications described above, one or more non-WI-FI technology radios can coexist on a WI-FI device (e.g., a WI-FI AP or WI-FI non-AP STA). This can cause interference with WI-FI transmissions as these co-located radios do not follow the same channel access and transmission protocols as WI-FI. Such interference is referred to herein as self-interference.

This self-interference can affect the AP MLD's ongoing transmissions/receptions as the SINR gets reduced leading to packet losses. Such packet losses can also lead to a drop in rates by the rate selection algorithm at the transmitter side as the algorithm does not know that the packet losses occurred due to unexpected and infrequent interference rather than channel losses. In some cases, the current transmission can also be interrupted if another wireless technology radio is given a higher priority internally within the device.

Such sudden interrupts given to the WI-FI radio can disrupt communication triggering AP search and (Re)association protocols. Further, as some of the technologies extend their operation to 5 GHz and 6 GHz band of operation, WI-FI performance in those bands will also be affected. There can also be additional delays that can be caused by deferring to non-WI-FI technology transmissions.

The same problem can also occur when a radio on a device becomes unavailable for WI-FI reception for other reasons, e.g., due to peer-to-peer (P2P) activity with a peer STA. A transmitting AP may not know that the STA is unavailable, and this may end up resulting in punishment on the performance, e.g., the AP dropping its rates.

Interference to WI-FI transmissions of a device caused by co-located non-WI-FI radios (i.e., self-interference) and interference to the WI-FI transmissions of the device caused by P2P activity with a peer STA may be collectively referred to herein as coexistence interference or coexistence effects.

Accordingly, embodiments of the present disclosure consider such coexistence effects and provide methods and apparatuses with which the AP MLD can inform its associated non-AP MLDs about the interference, as well as to address such interference and reduce its impact on the WI-FI network performance. This issue can also be faced at the non-AP MLD side.

For example, embodiments of the present disclosure include: An advertisement procedure for advertisement of the self-interference (or coexistence) constraints and corresponding signaling, a reconfiguration procedure for avoiding self-interference, a number of procedures to react to self-interference when it occurs, additional procedures that can benefit the Mobile AP MLD case, and additional methods to perform power saving when facing the self-interference issue.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using WI-FI or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
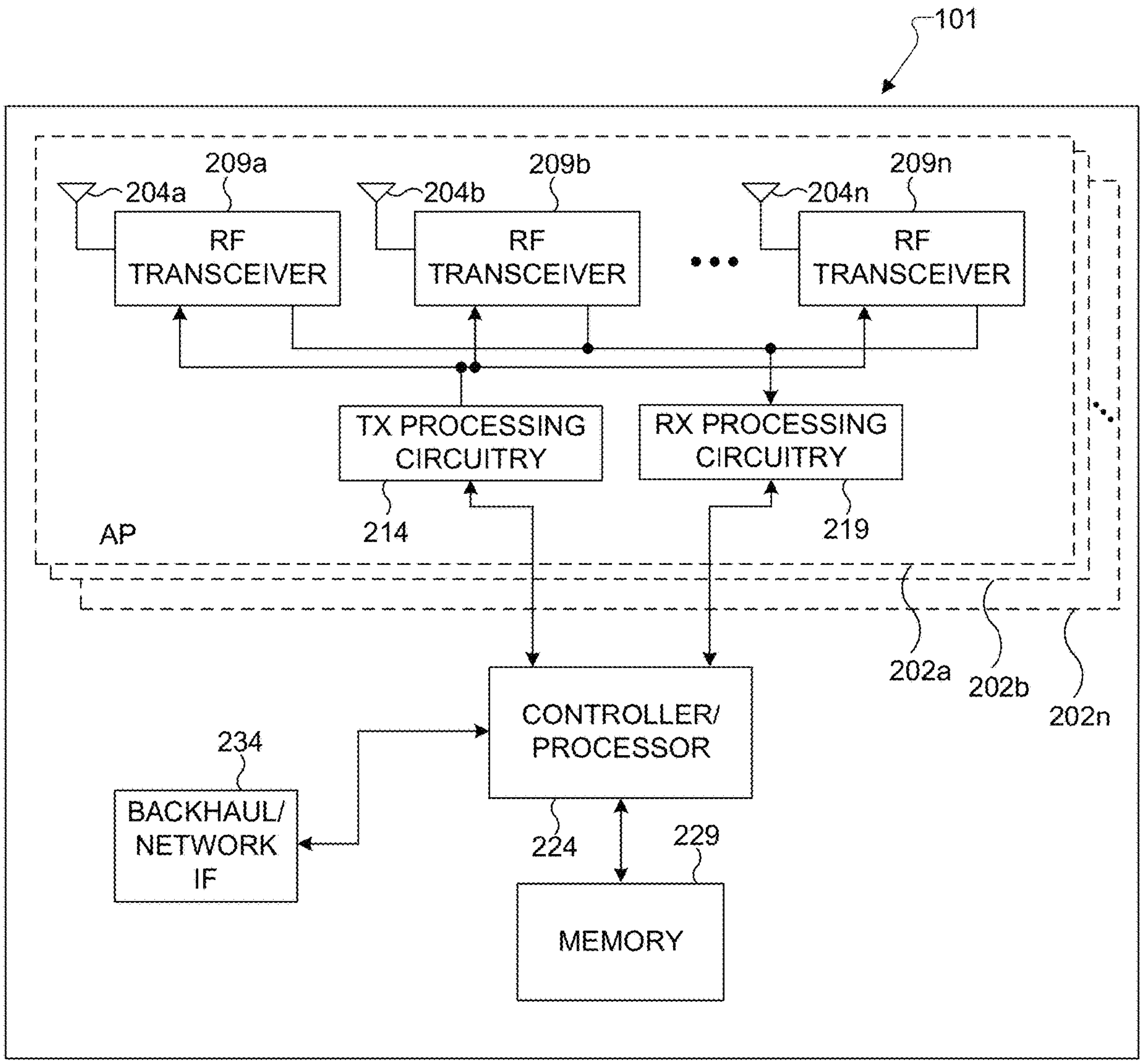
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202*a*-202*n* (which may be referred to, for example, as AP1-APn). Each of the affiliated APs 202*a*-202*n* includes multiple antennas 204*a*-204*n*, multiple RF transceivers 209*a*-209*n*, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202*a*-202*n* may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202*a*-202*n*.

For each affiliated AP 202*a*-202*n*, the RF transceivers 209*a*-209*n* receive, from the antennas 204*a*-204*n*, incoming RF signals, such as signals transmitted by STAs in the network 100. In some embodiments, each affiliated AP 202*a*-202*n* operates at a different bandwidth, e.g., 2.4 GHz, 5 GHZ, or 6 GHz, and accordingly the incoming RF signals received by each affiliated AP may be at a different frequency of RF. The RF transceivers 209*a*-209*n* down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202*a*-202*n*, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-convert the baseband or IF signals to RF signals that are transmitted via the antennas 204*a*-204*n*. In embodiments wherein each affiliated AP 202*a*-202*n* operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). The controller/processor 224 could also facilitate mitigation of coexistence effects on WI-FI transmission or reception by co-located non-WI-FI technology radios or P2P WI-FI transmissions in the AP MLD 101. Any of a wide variety of other functions could be supported in the AP MLD 101 by the controller/processor 224. In some embodiments, the controller/processor 224 includes at least one microprocessor or microcontroller. The controller/processor 224 is also capable of executing programs and other processes resident in the memory 229, such as operations for facilitating mitigation of coexistence effects on WI-FI transmission or reception by co-located non-WI-FI technology radios or P2P WI-FI transmissions in the AP MLD 101. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connections. For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202*a*-202*n* is shown as including a single instance of TX processing circuitry 214 and a single instance of RX processing circuitry 219, the AP MLD 101 could include multiple instances of each (such as one per RF transceiver) in one or more of the affiliated APs 202*a*-202*n*. Alternatively, only one antenna and RF transceiver path may be included in one or more of the affiliated APs 202*a*-202*n*, such as in legacy APs. Also, various components in FIG. 2A could be combined, further subdivided, or omitted and additional components could be added according to particular needs.

Figure 2B:
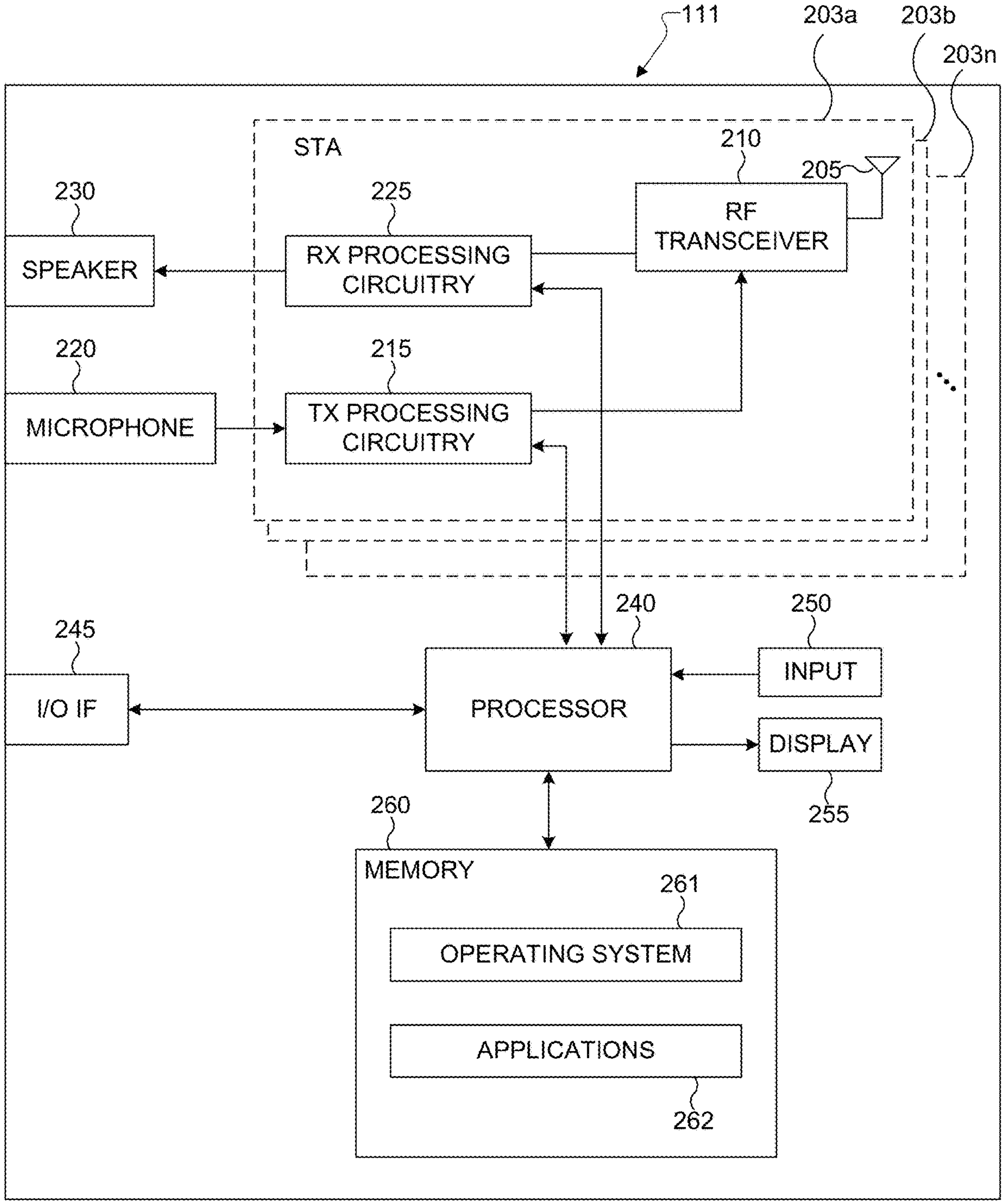
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203*a*-203*n* (which may be referred to, for example, as STA1-STAn). Each of the affiliated STAs 203*a*-203*n* includes antennas 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203*a*-203*n* may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203*a*-203*n*.

For each affiliated STA 203*a*-203*n*, the RF transceiver 210 receives from the antennas 205, an incoming RF signal transmitted by an AP of the network 100. In some embodiments, each affiliated STA 203*a*-203*n* operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203*a*-203*n*, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antennas 205. In embodiments wherein each affiliated STA 203*a*-203*n* operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate mitigation of coexistence effects on WI-FI transmission or reception by co-located non-WI-FI technology radios or P2P WI-FI transmissions in the non-AP MLD 111. In some embodiments, the controller/processor 240 includes at least one microprocessor or microcontroller.

The controller/processor 240 is also capable of executing other processes and programs resident in the memory 260, such as operations for facilitating mitigation of coexistence effects on WI-FI transmission or reception by co-located non-WI-FI technology radios or P2P WI-FI transmissions in the non-AP MLD 111. The controller/processor 240 can move data into or out of the memory 260 as required by an executing process. In some embodiments, the controller/processor 240 is configured to execute a plurality of applications 262, such as applications for facilitating mitigation of coexistence effects on WI-FI transmission or reception by co-located non-WI-FI technology radios or P2P WI-FI transmissions in the non-AP MLD 111. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203*a*-203*n* may include any number of antennas 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

For UWB use cases involving indoor positioning and navigation using the 6 GHz band, the IEEE 802.15.4 amendment defines a block based mode for ranging in which there are ranging blocks which are divided into ranging rounds which are further divided into ranging slots. The number of ranging rounds in a ranging block, the number of ranging slots in a ranging round and the duration of ranging slot are transmitted by the controller in ranging control message (RCM) to the participant devices. The information can be for current ranging round and potential subsequent ranging rounds as well. A ranging slot in which the device is expected to be active is referred to as active slots. There can also be inactive and silent periods.

Figure 3:
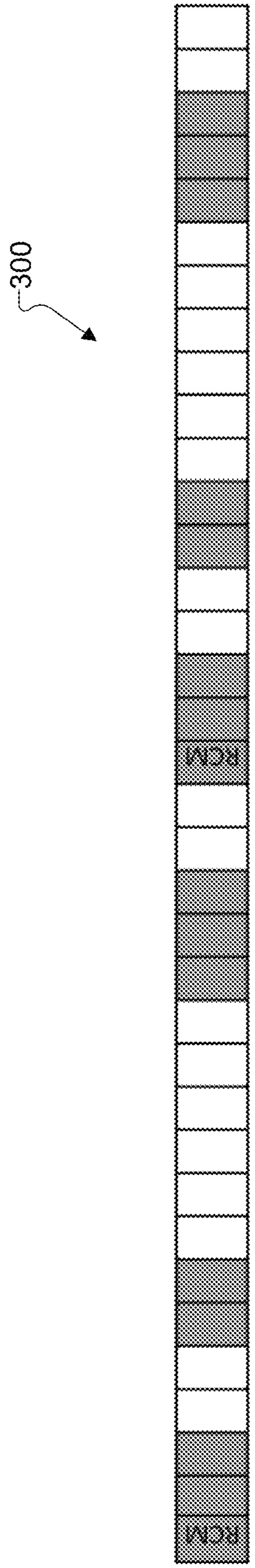
FIG. 3 illustrates an example of a ranging round for UWB according to embodiments of the present disclosure.

FIG. 3 illustrates an example of a ranging round 300 for UWB according to embodiments of the present disclosure. The active slots are shaded, and the inactive/silent slots are shown in white.

The ZIGBEE protocol operates based on the concept of beacon intervals. The coordinator in a ZIGBEE operation sends out periodic beacons. Each beacon is followed by the start of an active phase. The beacon announced the duration of the active phase and the time until the next beacon transmission. Each beacon interval thus is divided into two phases—1. Active phase which starts right after the beacon 2. Passive phase for power save. The active phase can be divided into contention based period and contention free period. The duration of each of the phases and the beacon interval can be characterized by aBaseSlotDuration value, macBeaconOrder (BO) and macSuperframeOrder (SO). BO and SO are integer values ranging from 0 to 14. The beacon interval can be computed as aBaseSuperframeDuration*$2^{BO}$ and the active phase can be computed as aBaseSuperframeDuration*$2^{SO}$ where aBaseSuperframeDuration=16*aBaseSlotDuration.

Figure 4:
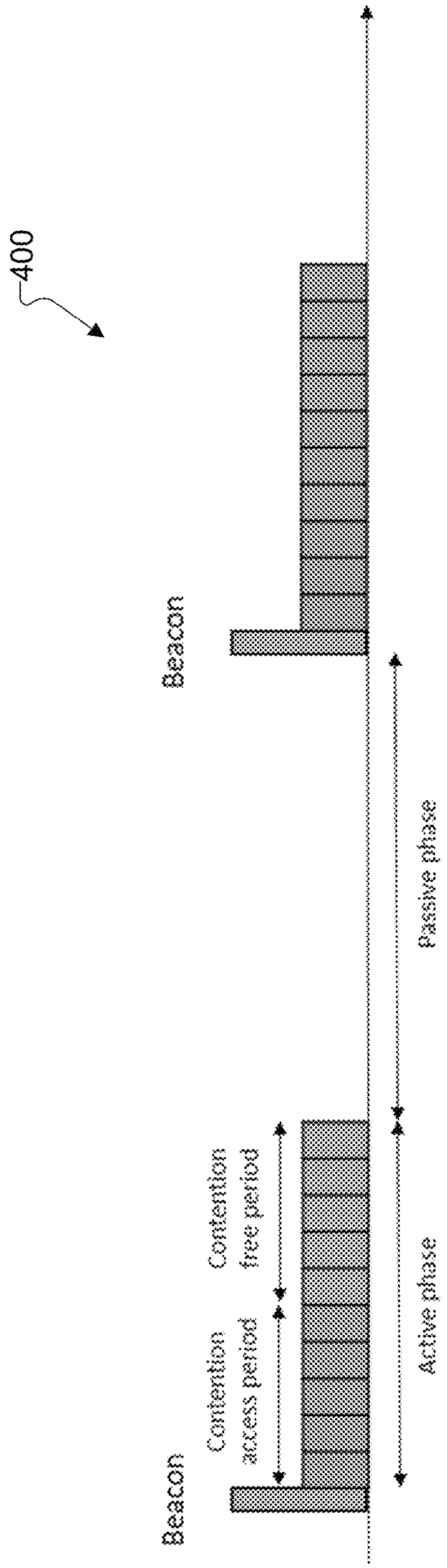
FIG. 4 illustrates an example timing diagram for ZIGBEE protocol operation according to embodiments of the present disclosure.

FIG. 4 illustrates an example timing diagram 400 for ZIGBEE protocol operation according to embodiments of the present disclosure. The example of FIG. 4 illustrates the beacon interval and active and passive phases of ZIGBEE.

Although various embodiments provided herein below are described in the context of single link APs and STAs, it is understood that this disclosure is not to limited to single link operation. These embodiments are also applicable to multi-link operation with AP MLDs and non-AP MLDs. Furthermore, the procedures described in this disclosure can be used for any type of transmitter and receiver—e.g., the transmitter can be an AP MLD and receiver can be a non-AP MLD or the transmitter and receiver can both be non-AP MLDs.

Likewise, some embodiments provided herein below are described in the context of multi-link operation with MLDs, but it is understood that such embodiments are not limited to MLDs and can also apply to single link devices.

Figure 5:
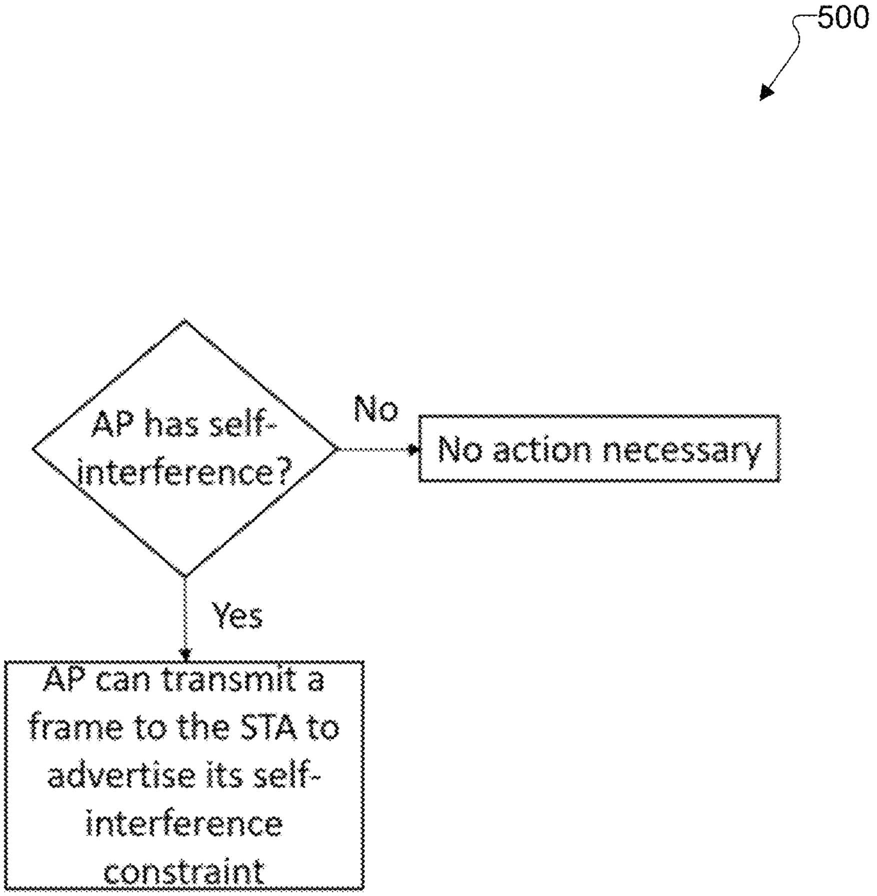
FIG. 5 illustrates an example process for AP-side advertisement according to embodiments of the present disclosure.

According to one embodiment, the AP can advertise its self-interference constraint to the STA when present as shown in FIG. 5. Such an advertisement can help the STA make decisions when associating with the AP and know beforehand that its performance can be limited by such self-interference. For example, if the STA is undergoing the handover procedure and the STA has multiple APs in the vicinity, knowledge of the AP's self-interference constraint can enable the STA to associate with an AP without self-interference constraint or with one that has the least expected self-interference levels if one exists and is available during the handover procedure. In another example, if the STA has more than one AP to associate with and its current AP starts to advertise self-interference and if this is not preferred for the STA, then the STA can disassociate with the current AP and associate with another AP without such a constraint. Such an advertisement can also help neighboring AP that the AP is coordinating with to consider the self-interference constraint of the AP when doing multi-AP coordination.

FIG. 5 illustrates an example process 500 for AP-side advertisement according to embodiments of the present disclosure. According to this embodiment, the AP can advertise its self-interference (or coexistence) constraint in one or more frames that it transmits to the STA. The frame transmitted to the STA to advertise the self-interference can contain one or more of the information items as indicated in Table 1. STA can also transmit such information to the AP to inform the AP of its self-interference constraint (e.g., by transmitting a frame containing the information upon/during (Re)association).

TABLE 1

| Information item | Description |
|---|---|
| Interference presence | An information item that can indicate the presence of interference from non-WI-FI technology. E.g., a field that can take a specific value to indicate the presence such as a bit that can be set to 1 to indicate that there is interference from non-WI-FI technology and to 0 to indicate otherwise. |
| Interference type | An information item that describes the type of interference. E.g., BLUETOOTH, UWB, ZIGBEE, etc. |
| Link information | Information of the links which can be impacted by the self-interference. E.g., Link id or indication via link id bitmap |
| Interference predictability | An information item that indicates whether the interference is predictable or not. |
| Interference periodicity | An information item that indicates whether the interference is periodic or not. This can also be indicated implicitly based on the signaling that is used. E.g., use of signaling meant for TWT or its variants. |
| Interference occurrence expectation | An information item that describes when the interference is expected to occur in a given period of time. E.g., timestamp information, duration, start time, interval |
| AP-side action capability | Can AP take any action to avoid/deal with the interference or not. |
| Interference level | An information item that indicates the amount of interference that can be faced to the reception. E.g., interference level indicated in dB. |
| Transmission configuration information | An information item that can indicate the transmission configuration at the transmitter that is necessary for the reception to be able to withstand the interference from non-WI-FI technology. E.g., the desired RSSI levels, robust MCS rates for transmissions, etc. |

The above information can be transmitted in an independent frame or in any of the frames existing in the standard (e.g., beacons). Additionally, in MLO the above information items can be transmitted on the same link that the information corresponds to or can be transmitted on a different link from that which the information corresponds to (e.g., along with the information of the other link).

Figure 6:
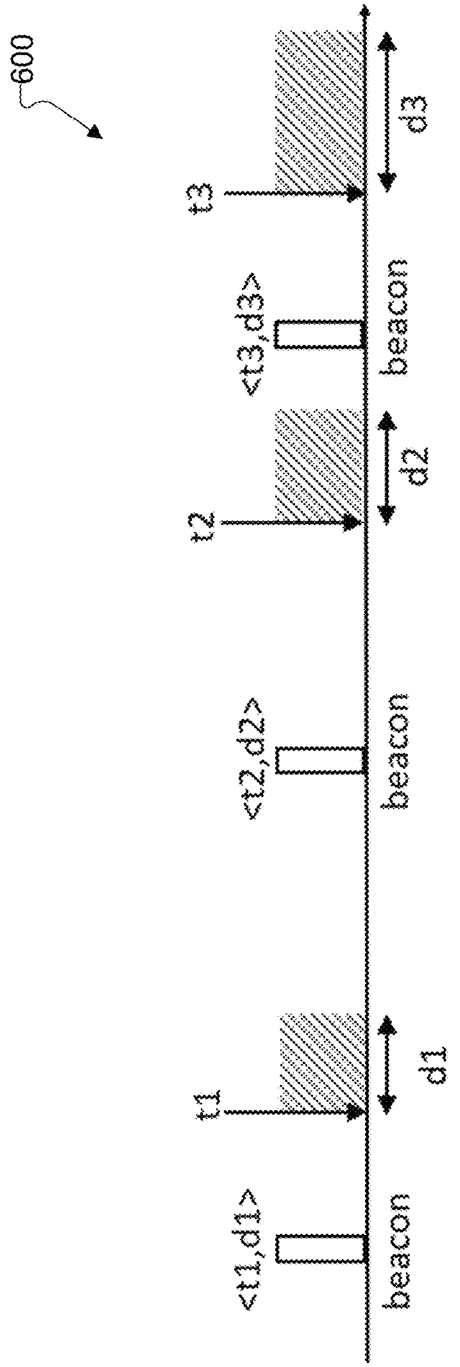
FIG. 6 illustrates an example timing diagram of a self-interference constraint advertisement on the same link on which the self-interference occurs according to embodiments of the present disclosure.

FIG. 6 illustrates an example timing diagram 600 of a self-interference constraint advertisement on the same link on which the self-interference occurs according to embodiments of the present disclosure. The shaded boxes illustrate the self-interference occurrence instances. The timings are referred to as t1, t2 and t3 and the duration as d1, d2 and d3.

Figure 7:
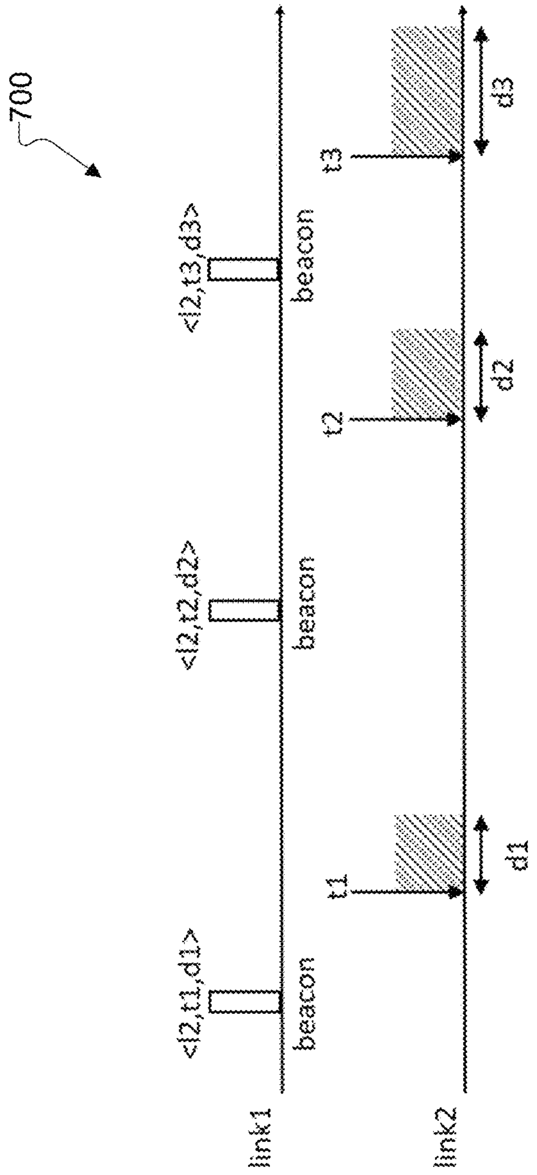
FIG. 7 illustrates an example timing diagram of a self-interference constraint advertisement on a different link from the one on which the self-interference occurs according to embodiments of the present disclosure.

FIG. 7 illustrates an example timing diagram 700 of a self-interference constraint advertisement on a different link from the one on which the self-interference occurs according to embodiments of the present disclosure. The example of FIG. 7 is similar to that of FIG. 6, except that there are two links referred to by the link identifiers link 1 and link 2.

Figure 8:
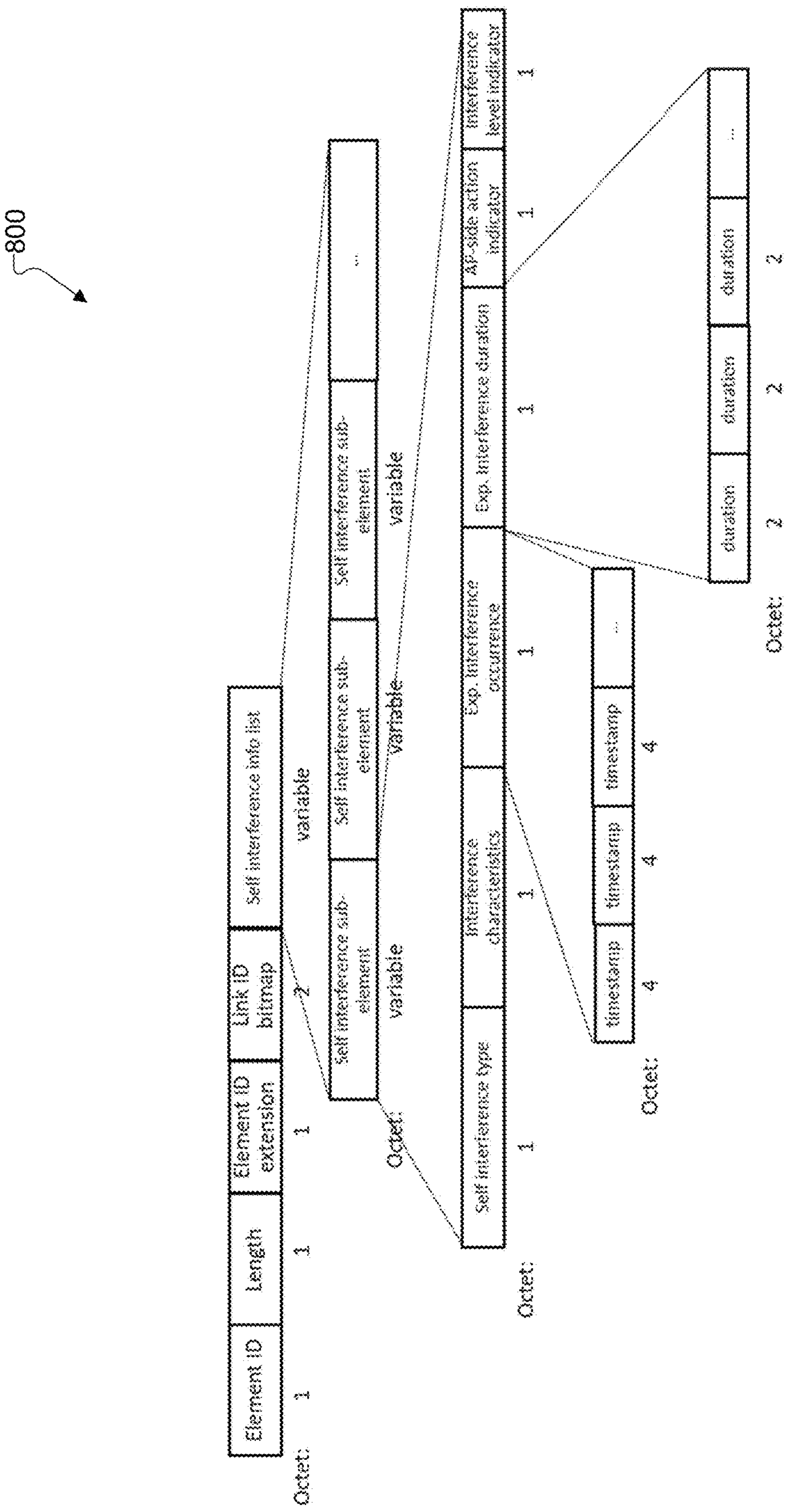
FIG. 8 illustrates an example format of an information element that can be used to advertise the self-interference (or coexistence) constraint at the AP according to embodiments of the present disclosure.

FIG. 8 illustrates an example format 800 of an information element that can be used to advertise the self-interference (or coexistence) constraint at the AP according to embodiments of the present disclosure. The example information element of FIG. 8 may be used for a method of advertising the self-interference based on the information items in Table 1.

In the example information element of FIG. 8, link ID bitmap can be a bitmap in which the links for which the self-interference is characterized in the information element can be indicated. The bit corresponding to the link(s) for which the self-interference (or coexistence effect) is characterized in the information element can be set to 1. If there is a link which is not impacted by the self-interference or for which the self-interference information is not indicated, then the bit corresponding to that link can be set to 0.

The self-interference info list can be made up of one or more self-interference sub-elements which can indicate the characteristics of the self-interference from each non WI-FI technology. Each self-interference sub-element can contain the self-interference type sub-field which can take various integer value to indicate different non WI-FI technologies, interference characteristics which can take specific values to indicate whether the interference is predictable, non-predictable, etc. Each self-interference sub-element can further contain the expected interference occurrence sub-field which can provide timestamps before the next beacon when the interference can be expected, the expected interference duration sub-field which can provide the duration for which the interference can exist for each of the timestamps indicated in the expected interference occurrence sub-field, and the AP-side action indicator sub-field which can take various values to indicate different actions that the AP can take to minimize the impact of the interference.

Each self-interference sub-element can also be tagged with the corresponding link ID to indicate which link the self-interference information corresponds to. The above information element can also contain a field to indicate if the interference can interrupt an ongoing transmission from the AP for WI-FI side.

When the self-interference arising from one or more non-WI-FI technologies stops, the AP can stop advertising the corresponding information or alternatively just advertise the self-interference type tagged with the link ID and skip the remaining fields in the self-interference sub-element.

The above information element can be transmitted from the AP-side as a part of the beacon, probe request, and probe response frames. If the STA-side has self-interference, it can transmit the above information element as a part of the frames that it transmits such as management frames (e.g., probe request frame, (Re)association request frame, etc.).

According to one embodiment, if an AP detects an issue arising from the self-interference, the AP can perform a reconfiguration (e.g., channel switch to go to a different band channel) to avoid the interference to its devices when possible.

Figure 9:
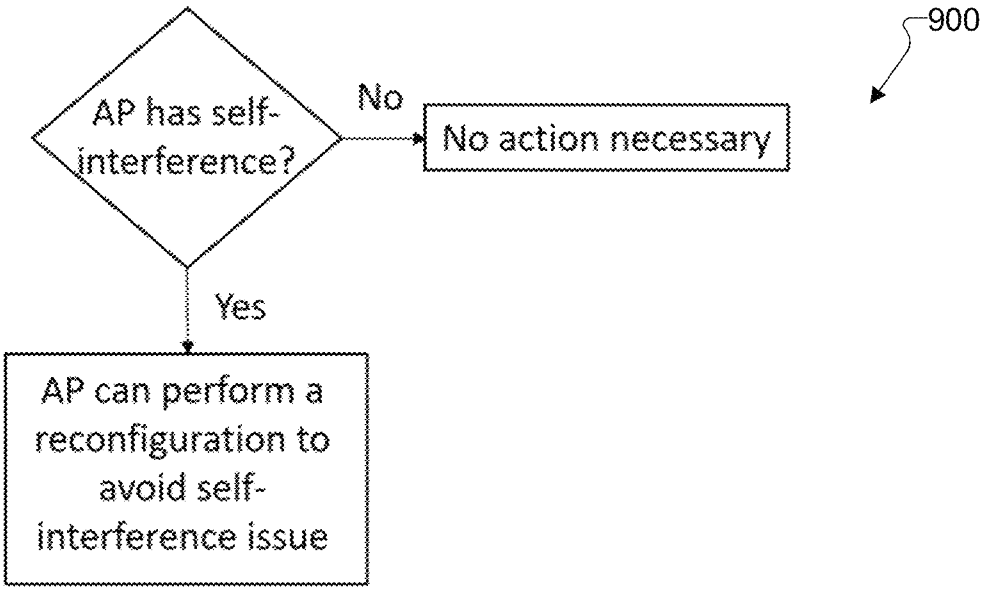
FIG. 9 illustrates an example process for AP-side reconfiguration to avoid self-interference according to embodiments of the present disclosure.

FIG. 9 illustrates an example process 900 for AP-side reconfiguration to avoid self-interference according to embodiments of the present disclosure. This can be useful if the interference from the non-WI-FI technology is limited to only one particular band or a select set of channels within the band and if the AP has other configuration options that can completely avoid/largely mitigate the impact of the interference. E.g., if the interference is from UWB and is limited to 6 GHz alone, then when UWB radio is turned on, AP can perform a reconfiguration to switch to either 2.4 GHz or 5 GHz band. In order to do this, the AP can use any of the existing frameworks in the spec (e.g., channel switch announcement element).

According to one embodiment, if the interference is periodic and the interference times and durations are known, then AP can terminate all uplink transmissions and downlink transmissions (if self-interference can cause an issue to BA reception) before the start of the interference. E.g., AP can transmit a termination signal such as a CF-end frame.

According to another embodiment, the AP can also design TWT/R-TWT schedules such that they can avoid the non-WI-FI interference. E.g., AP can create an R-TWT schedule such that the service period does not overlap with the self-interference window.

In another example, the AP can also use TWT schedules to indicate the time during which the AP is available/unavailable. For instance, the AP can do so by using a broadcast TWT element with TWT ID set to 0 and the responder PM Mode bit equal to 1 to indicate the time during which the interference does not occur. This can also be used when interference is not periodic, and the schedule can be designed such that the unavailability period covers the occurrence of the non-WI-FI interference.

There can also be an element similar to a TWT element that can inform the transmitter about the self-interference constraint. This could be, for example, a P2P TWT element. In this element, the service period related information can indicate the period of activity of non-WI-FI transmission and the doze information can indicate the doze periods of the non-WI-FI transmission. For instance, there can be a TWT agreement established between the STA and its associated AP by exchanging channel usage request and response frames. The service periods of such an agreement can indicate the period of activity/in-activity of the non-WI-FI transmission.

There can also be a new information field in TWT related signaling (or signaling related to variants of TWT) that can indicate to the transmitter the necessary configuration (e.g., MCS, NSS, etc.) to use to remain robust to self-interference at the receiver, e.g., this can be transmitted by the AP to the STA to inform the STA to use this configuration if AP has self-interference issue or vice versa.

According to one embodiment, a closed loop SINR control mechanism can be considered for addressing the self-interference issue. In one example, a target RSSI can be communicated to the transmitter when the receiver has the self-interference issue. The target RSSI can be communicated in one or more frames transmitted to the transmitter (e.g., a trigger frame). The target RSSI can be such that the reception can be successful in part or completely despite the self-interference issue. To meet the target RSSI, the transmitter can compute the transmit power level to be used such that the target RSSI requirement can be met.

However, AP can also get information of the self-interference start at a short notice and may need to react to it appropriately. Some additional procedures to react to the self-interference are as follows.

AP can also avoid channels that face interference from self-interference technologies by using other procedures in the spec. E.g., If the interference is limited to a select set of WI-FI channels, then AP can perform preamble puncturing/channel puncturing so that those channels do not get used. AP can puncture channels that face highest impact of such an interference and make an indication in the disabled sub-channel bitmap in EHT operation element. Another example is that AP can avoid assigning frequency resources from portions of bandwidth that face non-WI-FI technology interference. For instance, during OFDMA operation, the AP can avoid assigning those RUs to the STAs which overlap with channels facing non-WI-FI interference.

According to one embodiment, the STA can transmit an RTS to the AP on a number of channels by duplicating the RTS on each channel. The AP can respond with a CTS only on those channels on which the self-interference issue will not be faced during the data transmission duration (determined by using the duration field from RTS). On the other channels, AP won't send an RTS. STA can then only use those channels on which the CTS was received from the AP.

Figure 10:
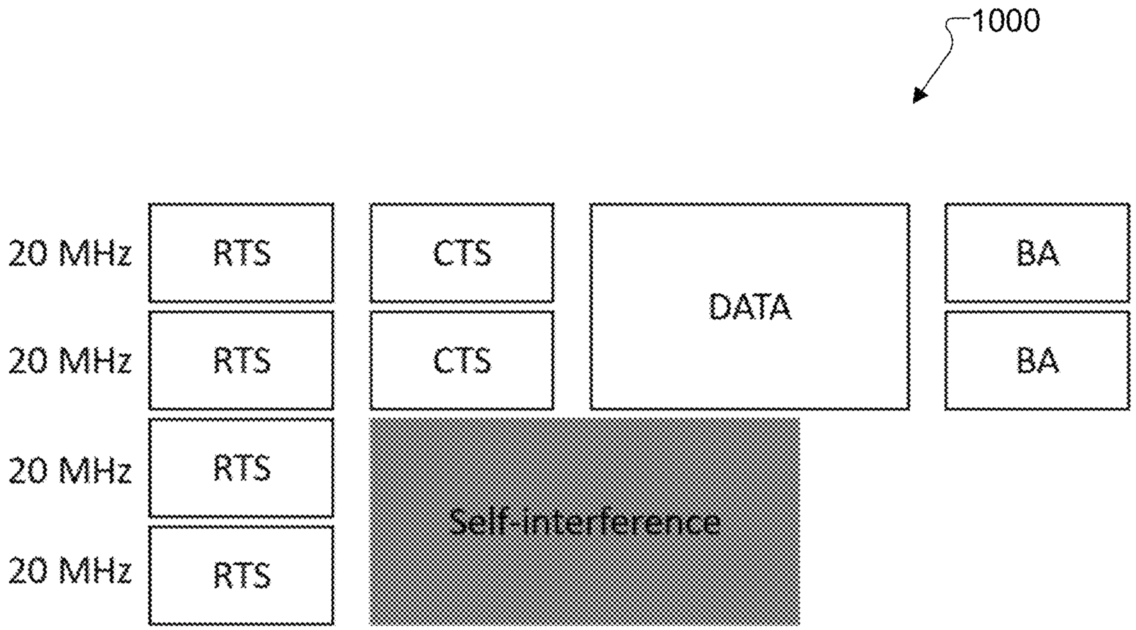
FIG. 10 illustrates an example channel resource diagram in which RTS/CTS is used to avoid channels that face self-interference issue according to embodiments of the present disclosure.

FIG. 10 illustrates an example channel resource diagram 1000 in which RTS/CTS is used to avoid channels that face self-interference issue according to embodiments of the present disclosure. As illustrated in FIG. 10, the STA wants to make an 80 MHz transmission. It creates an RTS frame and duplicates it on each of the primary 20 MHz channels. The AP only responds with a CTS on those 20 MHz channels on which the self-interference will not be an issue. The STA can then only transmit data on those channels on which the CTS was received from the AP.

According to one embodiment, if the interference is predictable and its duration can be known/estimated beforehand, then the AP can create an ON-OFF pattern in transmission to avoid the self-interference periods/windows. E.g., AP can introduce quiet periods during the time when the interference occurs. The AP can introduce a quiet period by transmitting the quiet element in the beacon.

Figures 11, 12:
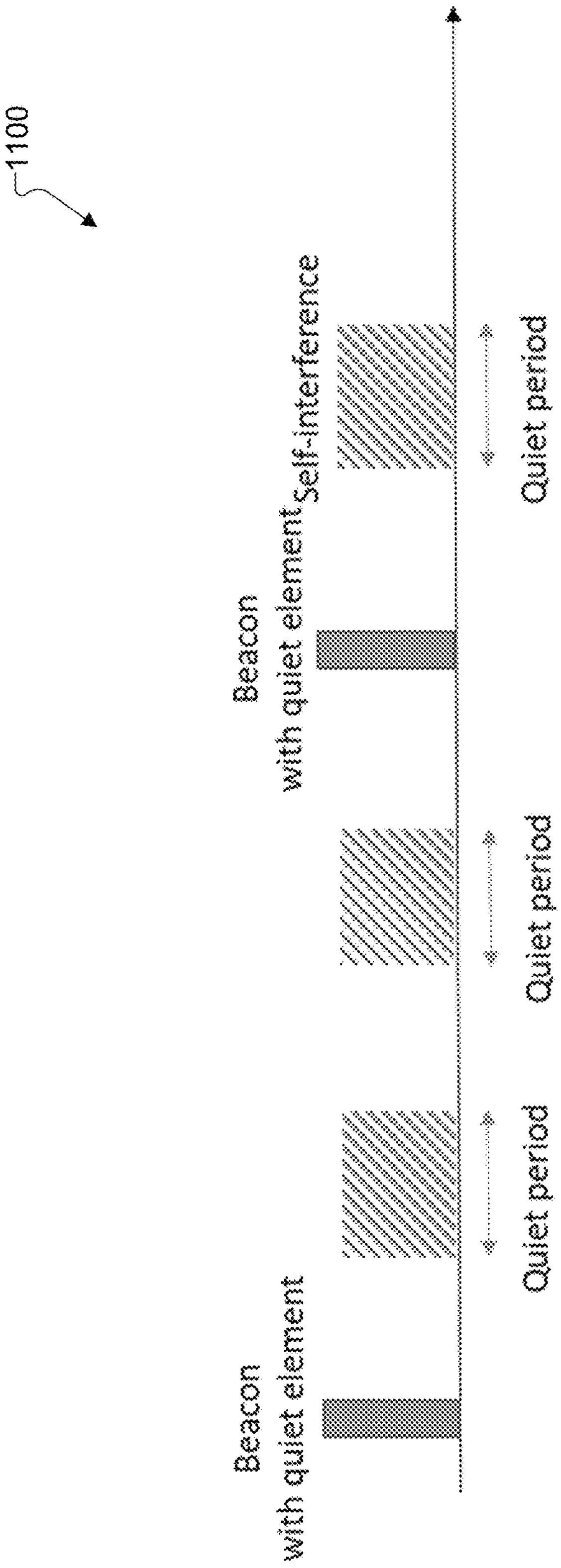
FIG. 11 illustrates an example timing diagram in which a quiet period is introduced to avoid periods of self-interference according to embodiments of the present disclosure.
FIG. 12 illustrates an example format of a modified quiet element according to embodiments of the present disclosure.

FIG. 11 illustrates an example timing diagram 1100 in which a quiet period is introduced to avoid periods of self-interference according to embodiments of the present disclosure.

According to another embodiment, there can be a modified quiet element which contains a field to indicate the direction of the traffic (e.g., uplink or downlink) and optionally the STA(s) who need to observe the quiet period. E.g., the AP can only introduce quiet periods for uplink traffic of STAs transmitting whose SINR can fall below the threshold required to decode the frame due to self-interference. Alternatively, AP can only quiet the downlink traffic of those STAs for whom the reduction in SINR due to self-interference can make it impossible to decode the acknowledgement (e.g., Block ACK).

FIG. 12 illustrates an example format 1200 of a modified quiet element according to embodiments of the present disclosure. In the example of FIG. 12, the direction field can take a value of 0 to indicate uplink, a value of 1 to indicate downlink, 2 for P2P, etc. The STA identifier can indicate identifiers for STAs (e.g., AIDs) who need to observe the quiet period for the direction indicated. The remaining devices can continue to transmit/receive their traffic from the AP. Such a modified quiet element can be carried in management frames (e.g., beacons).

According to one embodiment, when an AP receives an RTS/control frame from a STA and if it expects that during the uplink transmission of the STA there can be self-interference and the STA's uplink transmission cannot tolerate that interference, then the AP can avoid sending a CTS in response to the RTS.

According to another embodiment, if the AP if the AP receives an RTS/control frame from the STA and if the interference is expected to start during the TXOP of the STA based on the duration indicated in the RTS, then the AP can transmit a CTS/response frame with a duration of the self-interference period and/or a field indicating the start of the self-interference period. When the STA receives such a CTS/response frame from the AP, the STA can understand that there will be an interference from non-WI-FI technology starting at the time based on the duration field in the CTS/response frame.

According to another embodiment, if the AP shortens the duration in the CTS/response frame, the STA can implicitly understand when the interference is expected to start. The STA can drop its rates to a lower/robust rate (e.g., base rate) which is expected to be decoded despite the interference and continue the remainder of the transmission beyond this point. Alternatively, the STA may stop transmissions altogether for the period after the expected start of the interference (e.g., if the CTS is taken as an unavailability indication).

Figure 13:
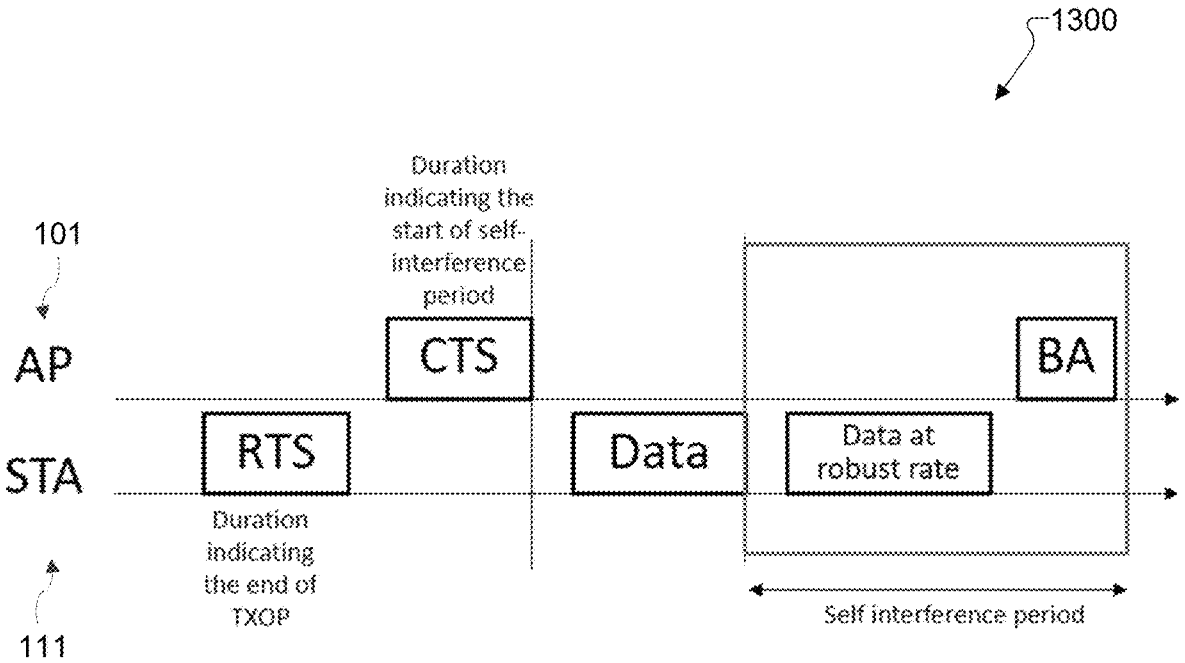
FIG. 13 illustrates an example timing diagram for a STA performing rate adaptation to avoid the self-interference issue according to embodiments of the present disclosure.

FIG. 13 illustrates an example timing diagram 1300 for a STA performing rate adaptation to avoid the self-interference issue according to embodiments of the present disclosure. In this example, the AP may be an AP 101, and the STA may be a STA 111. It is understood that references to an AP herein below refer to an AP 101, and references to a STA refer to a STA 111.

In the example of FIG. 13, after the STA receives the CTS from the AP it terminates its data transmission before the self-interference period starts, adapts to a robust data rate, and restarts data transmission at the robust data rate for the remainder of the TXOP in the self-interference period.

Alternatively, the STA can terminate its TXOP at the point indicated by the duration field in the CTS.

Figure 14:
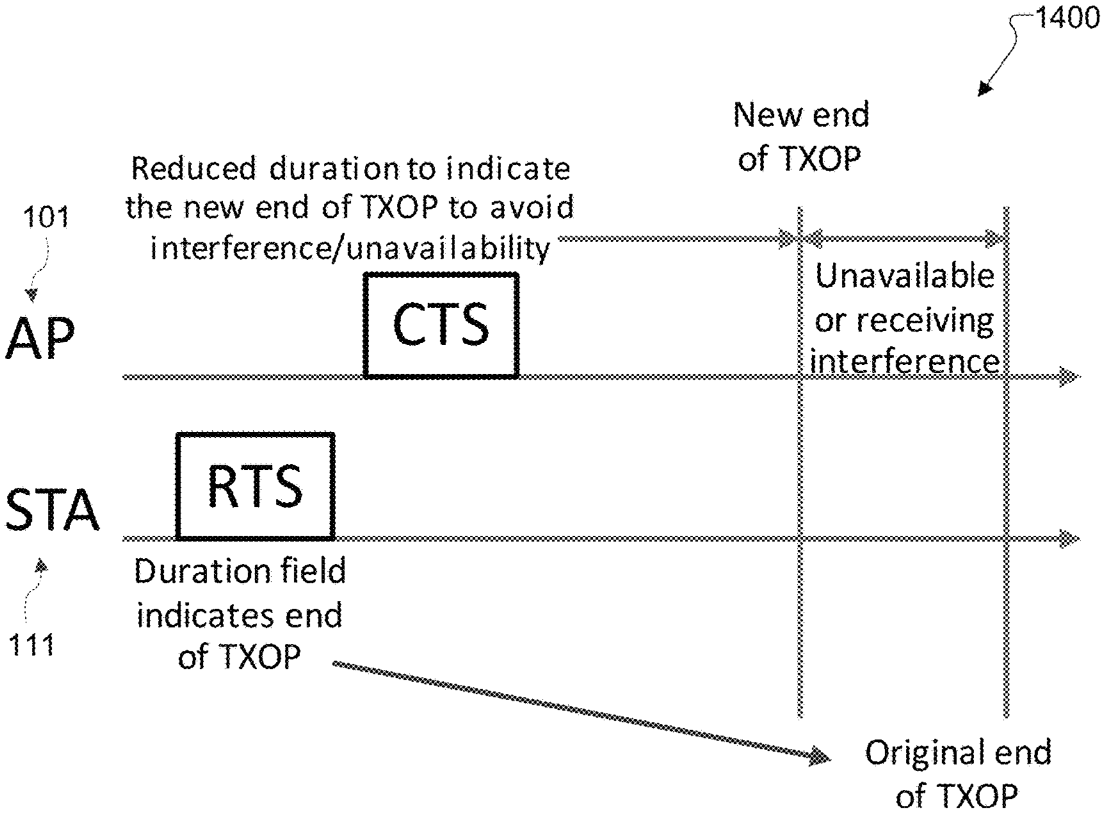
FIG. 14 illustrates an example timing diagram for a STA modifying its TXOP to avoid the self-interference issue according to embodiments of the present disclosure.

FIG. 14 illustrates an example timing diagram 1400 for a STA modifying its TXOP to avoid the self-interference issue according to embodiments of the present disclosure. In this example, the STA determines to stop transmissions altogether after the start point of the interference due to a coexistence effect during the self-interference period. The STA modifies its TXOP to end early as a result.

In some embodiments, if the data transmitted at the robust rate as in the example of FIG. 13 does not get received by the AP as indicated in the BA, then in future transmissions, the STA can terminate its TXOP at the point indicated by the CTS, similar to the example of FIG. 14.

When the STA chooses to transmit during the self-interference period, it can stop considering the impact of factors such as packet losses to its rate adaptation algorithm as it knows that the loss is due to self-interference. In one example, in order to do this, the STA can mark the sequence number from where the self-interference window started.

Alternatively, if the AP does not want the STA to transmit due to self-interference issue during its transmission period, the AP can respond with a CTS with a duration of value 0. If the STA receives such a duration field, then the STA can infer that the AP's response is due to self-interference and the STA can avoid dropping its rates when it performs rate adaptation.

According to one embodiment, if the receiver side faces interference due to non-WI-FI transmission during a frame reception, the receiver can provide an indication to the transmitter on how it can manage its transmit rate. For instance, the receiver can ask the transmitter to maintain the same rate of transmission if the current rate is robust for reception during non-WI-FI interference. If transmitter drops rate due to failure to receive a frame due to non-WI-FI interference, then the receiver can ask the transmitter to adapt rates to avoid a hit on performance. E.g., receiver can ask transmitter to resume prior rate or adjust it for future transmissions.

According to one embodiment, if the AP is performing downlink transmission and the interference start occurs during the downlink transmission and causes a reception failure for the STA's BA, then the AP can avoid dropping its rates for data transmission during the next attempt.

According to one embodiment, if the interference duration is short and can occur within a PPDU of an ongoing downlink transmission of the AP at the time of BA reception, then the AP can adapt the PPDU to avoid interference to the BA. The AP can first inform the STA about the interference occurrence. This can be done by transmitting a frame that can contain one or more of the information items as indicated in Table 2.

TABLE 2

| Information item | Description |
|---|---|
| Self-interference indicator | An information item to indicate the presence of self-interference. E.g., a bit that can be set to 1 to indicate that the interference is present. |
| Duration of self-interference | The duration for which the interference is expected to last. E.g., an integer value that can indicate the duration of the interference in terms of a unit (e.g., microseconds). |
| Link ID indicator | An information item to indicate the link for which this information is being indicated. E.g., Link ID |
| Self-interference timing information | An information item to indicate the timing information for the self-interference. E.g., the start time of the self-interference. |

In one example, this can be done by inserting a control sub-field variant of an A-control subfield inside the PPDU. If the STA receives the A-control subfield, then it knows that there is self-interference issue on the AP side and can delay the BA until the end of the self-interference duration. The control sub-field variant of the A-control subfield can contain one or more of the information items as indicated in Table 2.

Figure 15:
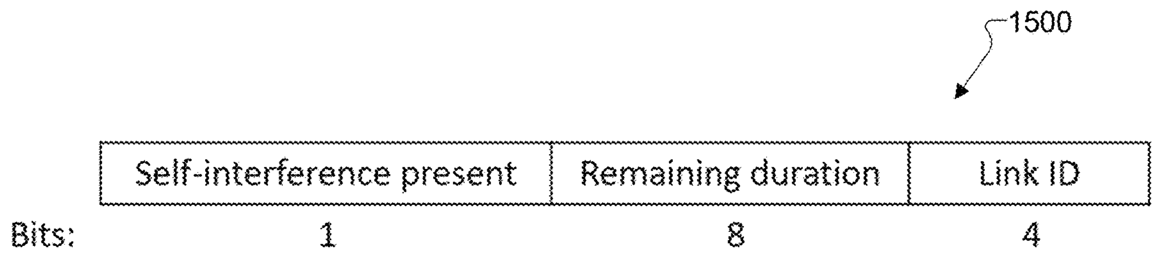
FIG. 15 illustrates an example format of a control subfield variant of the A-control subfield according to embodiments of the present disclosure.

FIG. 15 illustrates an example format 1500 of a control sub-field variant of the A-control subfield according to embodiments of the present disclosure. This example is based on the information items indicated in Table 2. The self-interference present bit can be set to 1 to indicate that there is self-interference at the receiver. The remaining duration can provide the remaining duration for which the self-interference issue can be present at the receiver. The link ID can indicate the link on which this self-interference issue can be present.

Figure 16:
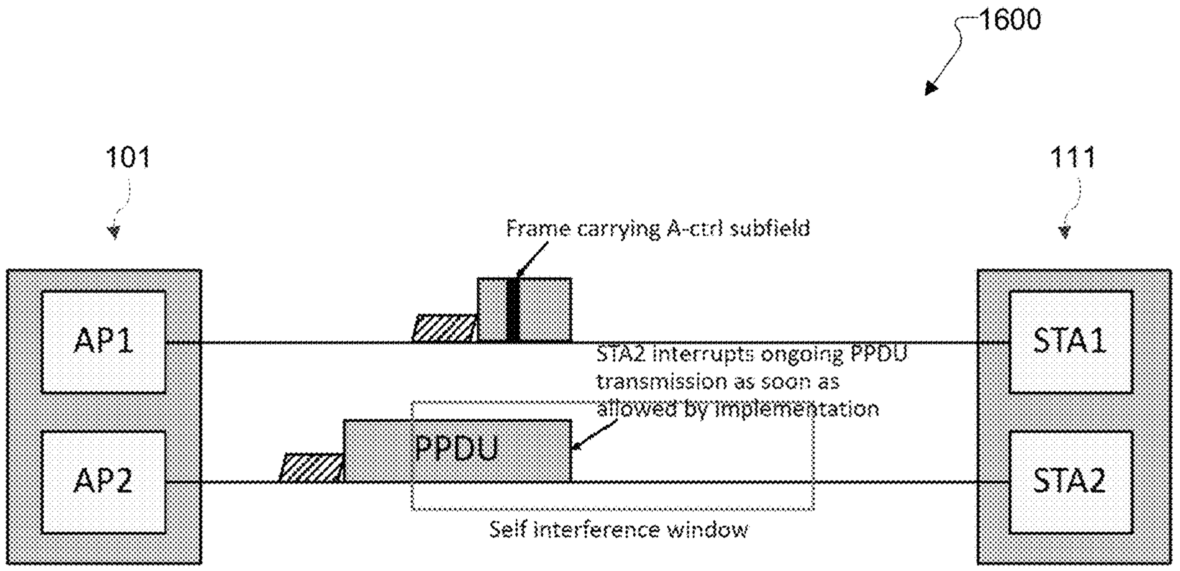
FIG. 16 illustrates an example operation of a variant of the A-control subfield according to embodiments of the present disclosure.

FIG. 16 illustrates an example operation 1600 of a variant of the A-control subfield according to embodiments of the present disclosure. This example uses the example format 1400 of the control sub-field variant of the A-control subfield. The AP MLD may be an AP MLD 101, and the non-AP MLD may be a non-AP MLD 111. It is understood that further references to an AP MLD refer to an AP MLD 101, and further references to a non-AP MLD refer to a non-AP MLD 111. Although the AP MLD is depicted as having two affiliated APs (AP1 and AP2) and the non-AP MLD is depicted as having two affiliated non-AP STAs (STA1 and STA2), it is understood that this operation may be performed with MLDs having any appropriate number of affiliated APs or non-AP STAs.

As illustrated in FIG. 16, STA2 is transmitting a PPDU to AP2. During the course of transmission, the self-interference starts to occur as shown in the figure. AP1 can transmit a frame to STA1 containing an A-control subfield (as a part of an ongoing transmission, as a QoS Null frame, etc.). Upon receiving the information, STA2 can interrupt the ongoing PPDU transmission as soon as allowed by implementation and not perform any transmission for the remaining duration. The same example can apply if the AP is transmitting to the STA.

According to another example, the information items indicated in Table 2 can be conveyed in a control frame.

Figure 17:
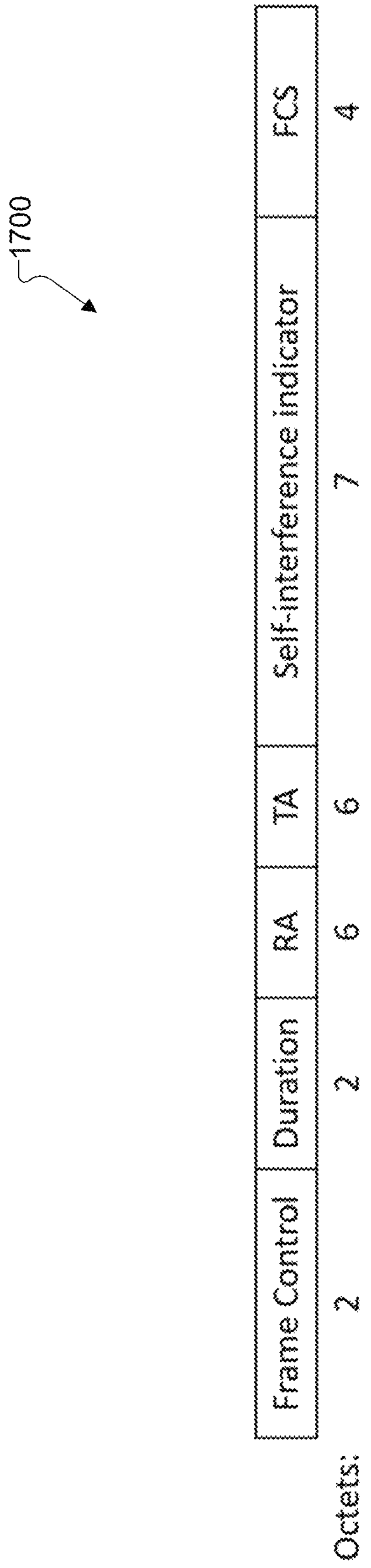
FIG. 17 illustrates an example format of a control frame according to embodiments of the present disclosure.

FIG. 17 illustrates an example format 1700 of a control frame according to embodiments of the present disclosure. Such a control frame may be used to convey the information items indicated in Table 2.

Figure 18:
FIG. 18 illustrates an example format of a self-interference indicator field of a control frame according to embodiments of the present disclosure.

FIG. 18 illustrates an example format 1800 of a self-interference indicator field of a control frame according to embodiments of the present disclosure. For example, the self-interference indicator field of a control frame using the format 1700 of FIG. 17 can have the example format 1800 of FIG. 18. The self-interference present bit can be set to 1 if there is self-interference or else it can be set to 0. The link ID can indicate the link for which this information corresponds to. The duration field can indicate the duration for which the self-interference can last. The start time information can indicate the start time of the self-interference window.

In the example operation 1600 shown in FIG. 16, instead of transmitting the frame containing the A-control subfield, the control frame can be transmitted. The remaining process can be the same as in the example.

According to one embodiment, the AP can take actions to delay the BA transmission from the STA-side such that the BA is not received when the self-interference is ongoing. AP can divide the payload beforehand into multiple smaller PPDUs. When interference starts and if AP knows that the interference is small enough then the AP can end the ongoing PPDU with a PPDU end marker (additionally AP can also include the A-control sub-field in the PPDU to inform the STA). The AP can then wait for a period of time to continue its PPDU transmission such that the BA reception occurs outside of the self-interference window.

Figure 19:
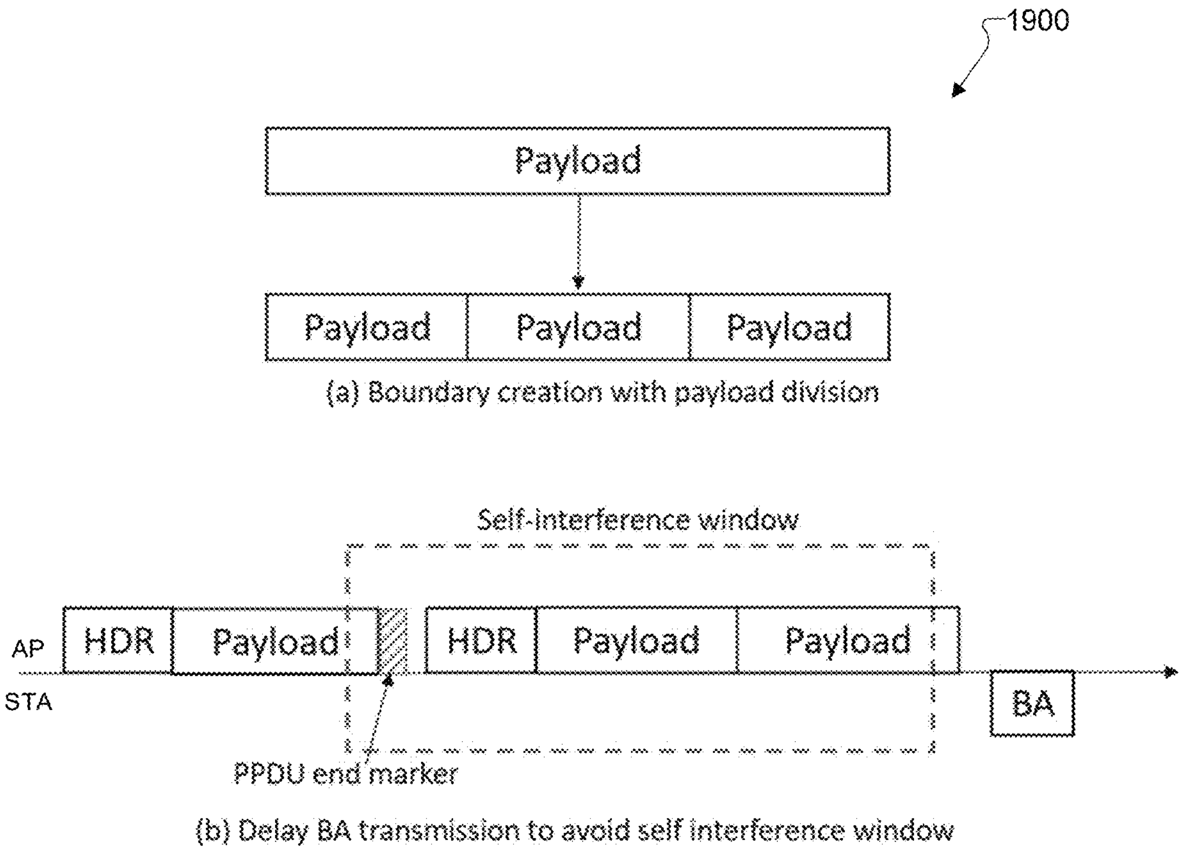
FIG. 19 illustrates an example operation in which the BA is delayed to avoid a self-interference window according to embodiments of the present disclosure.

FIG. 19 illustrates an example operation 1900 in which the BA is delayed to avoid a self-interference window according to embodiments of the present disclosure.

According to another embodiment, the AP can insert a PPDU end marker when self-interference window starts without any boundary creation. In such a case, the STA may not receive the last MPDU in the PPDU fragment completely. STA can discard such incomplete MPDUs, and AP can include them in the remaining portion of the fragmented payload that it transmits later on.

Figure 20:
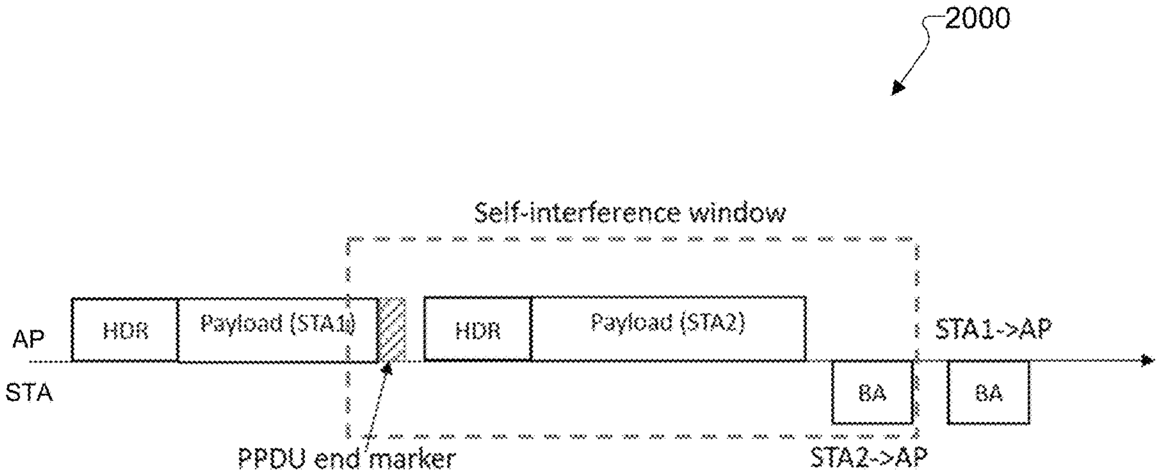
FIG. 20 illustrates an example operation in which an AP serves a different STA whose signal strength is enough to support BA transmission despite interference according to embodiments of the present disclosure.

According to another embodiment, if the AP does not have enough payload for the STA, then it can insert a PPDU end marker and serve some other STA whose signal strength is high enough to support BA reception despite the interference or whose transmission duration is enough to delay the BA of the original STA beyond the self-interference window FIG. 20 illustrates an example operation 2000 in which an AP serves a different STA whose signal strength is enough to support BA transmission despite interference according to embodiments of the present disclosure. In this example, the AP is initially serving STA1, then switches to serve STA2 during the self-interference window, as STA2 has signal strength high enough to support the BA transmission despite the interference.

According to another embodiment, if the STA is making a transmission on the uplink and the reception at the AP can suffer from self-interference, then the AP can inform the STA so that the STA can perform a PPDU division to avoid the interference duration.

Figure 21:
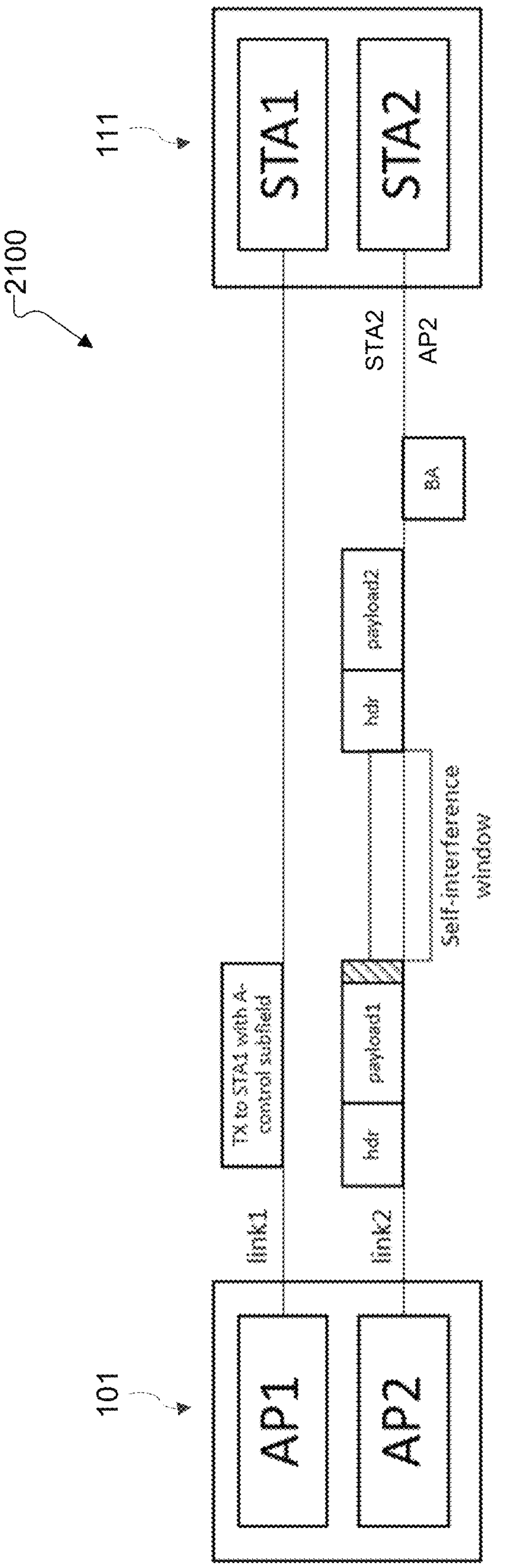
FIG. 21 illustrates an example operation in which a STA performs UL payload division according to embodiments of the present disclosure.

FIG. 21 illustrates an example operation 2100 in which a STA performs UL payload division according to embodiments of the present disclosure. In this example, there is an ongoing UL transmission from STA2 to AP2 on link2 that suffers from self-interference at the AP2. AP1 has a DL transmission on link1 to the same STA1. AP1 can include the A-control subfield variant described in Table 2 and the example of FIG. 15 inside this transmission on link1. Alternatively, AP1 can transmit a QoS Null frame on link1 to inform the STA1 if there is no ongoing DL transmission on link1. This information can be passed internally from STA1 to STA2. STA2 can then divide the PPDU as described in the example in FIG. 19 to avoid the self-interference window.

According to one embodiment, a notification frame can be used to interrupt an ongoing transmission if the receiver faces issues due to self-interference. The notification frame can carry a signaling to indicate that the interruption has occurred due to self-interference (e.g., this can be newly defined control frame as described previously). The notification frame can also be an acknowledgement frame such as Block ACK (BA) frame.

Figure 22:
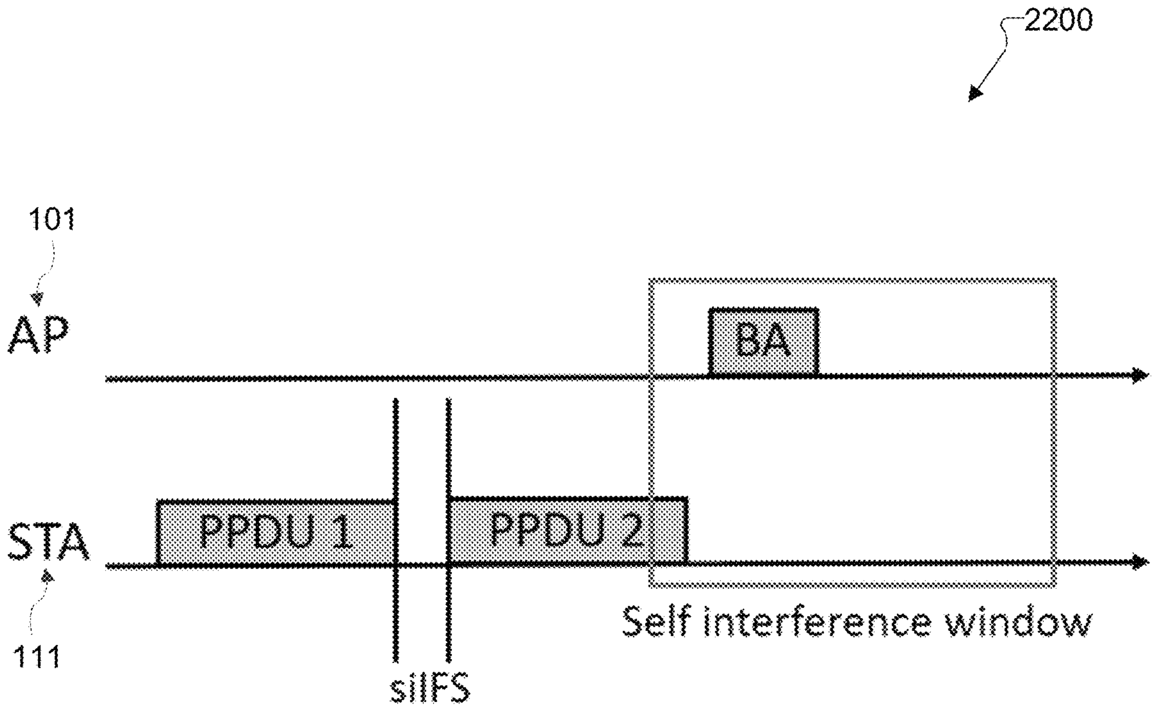
FIG. 22 illustrates an example operation using a BA to stop ongoing transmission according to embodiments of the present disclosure.

FIG. 22 illustrates an example operation 2200 using a BA to stop ongoing transmission according to embodiments of the present disclosure. As illustrated in FIG. 22, the transmitter can break down the PPDU into several smaller portions and separate them by an interframe spacing, referred to in this example as self-interference interface spacing (IFS) (siIFS) or coexistence IFS. When the receiver starts to receive self-interference, it can transmit a BA following the end of the ongoing PPDU and before the next PPDU transmission starts (e.g., during the siIFS). The transmitter can interrupt the next PPDU transmission when it receives the BA. The BA can also be sent before the self-interference starts.

Figure 23:
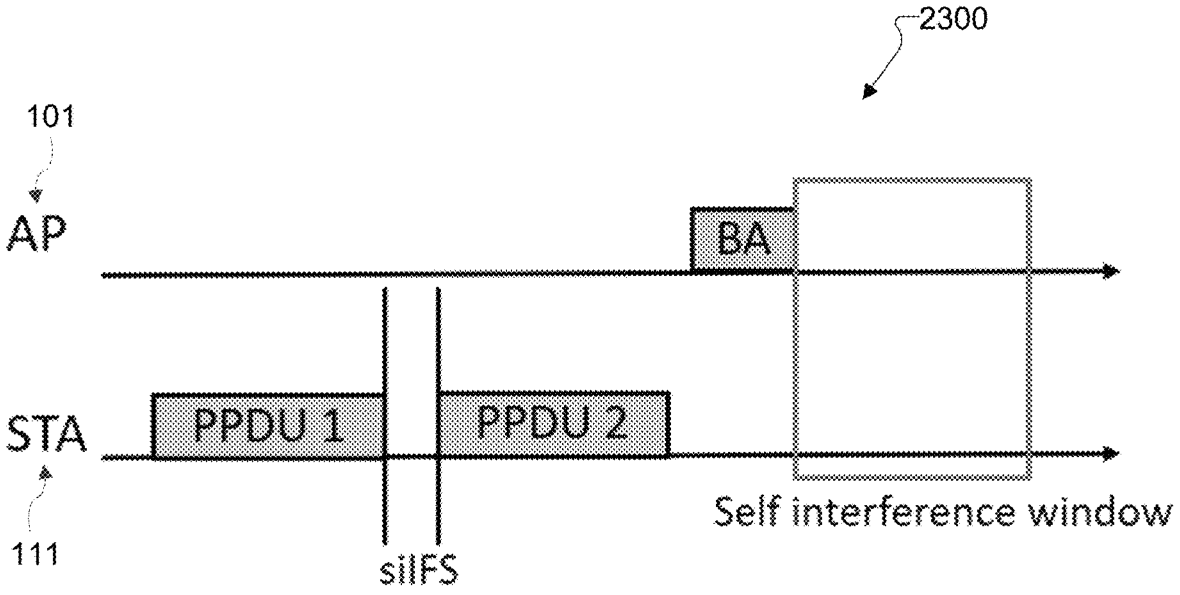
FIG. 23 illustrates another example operation using a BA to stop ongoing transmission according to embodiments of the present disclosure.

FIG. 23 illustrates another example operation 2300 using a BA to stop ongoing transmission according to embodiments of the present disclosure. In the example of FIG. 23, the receiver sends a BA during an siIFS before it experiences self-interference.

In some embodiments, instead of the BA a different notification frame may be used (e.g., CF end frame or a newly defined control frame).

According to one embodiment, the BA can carry a signaling to inform the transmitter that there was a self-interference issue during the corresponding PPDU transmission. The transmitter can then avoid reducing the rates in rate adaptation algorithm and thereby avoid the penalty due to lower rates. For instance, there can be a field (e.g., a bit) that can make such an indication by taking a predetermined value (e.g., 1) to make the indication and another predetermined value (e.g., 0) to indicate otherwise.

According to one embodiment, the AP can transmit a frame to prevent the STAs from sending any uplink transmission in the self-interference window. According to this embodiment, the frame transmitted by the AP can contain one or more of the information items as indicated in Table 2.

In one example, this frame can be a CTS-to-self frame that is transmitted by the AP. AP can transmit a CTS-to-self frame at the start of the self-interference window. AP can do so without contention so that the frame transmission can be aligned with the start of the self-interference window.

Figure 24:
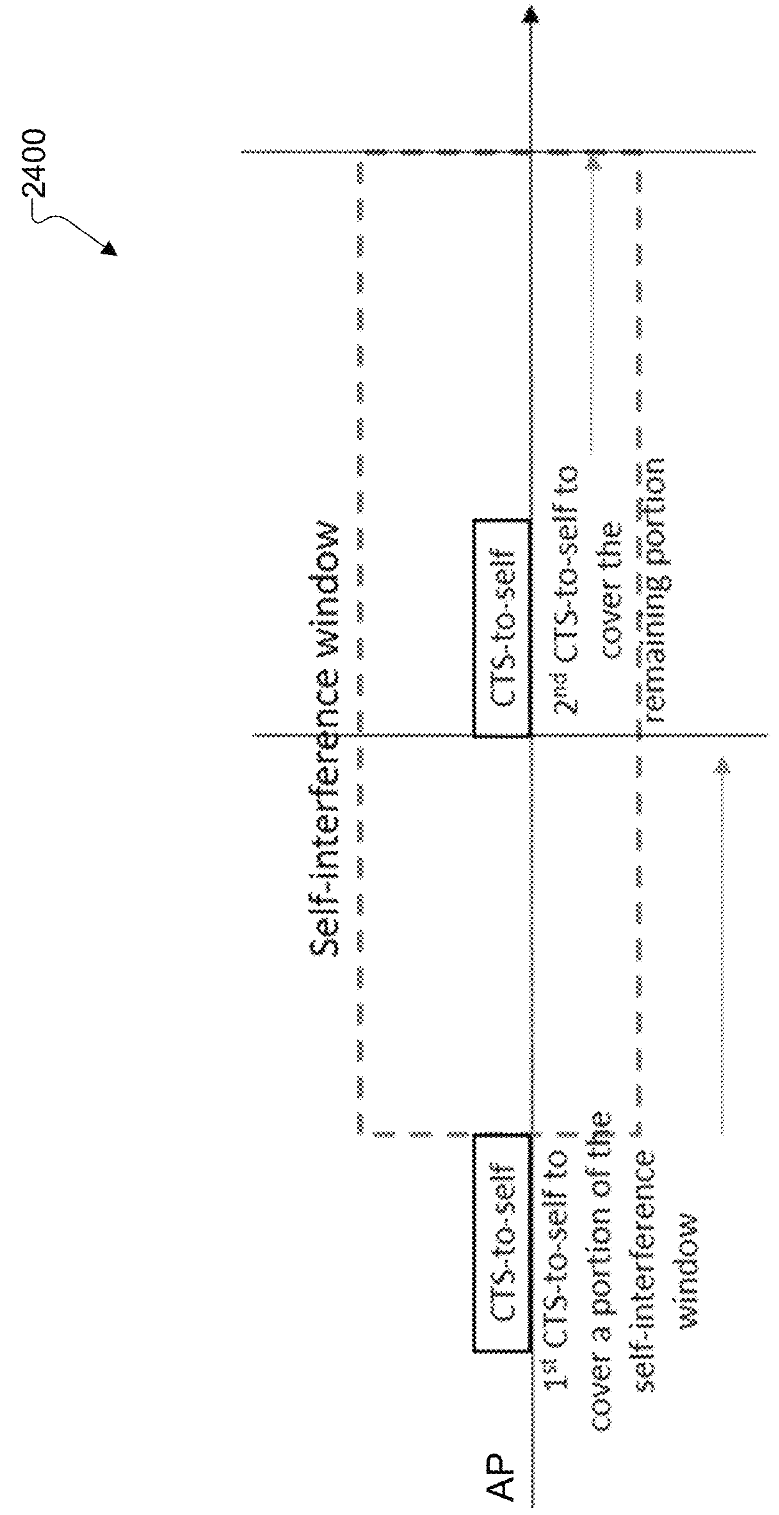
FIG. 24 illustrates an example operation in which a STA delays UL transmission beyond a self-interference window according to embodiments of the present disclosure.

FIG. 24 illustrates an example operation 2400 in which a STA delays UL transmission beyond a self-interference window according to embodiments of the present disclosure. AP can indicate the duration of the self-interference window in the duration field of the CTS-to-self frame. STAs that hear the AP's CTS-to-self frame can defer their transmissions thereby avoiding transmitting any uplink data to the AP in the self-interference window. If the AP does not know the duration of the self-interference window or if the duration of the self-interference window is more than the maximum duration that the AP is allowed to use in the duration field in the CTS-to-self (e.g., considering TXOP limits), then the AP can send more than one CTS-to-self, each one being sent after the duration of the previous one is over and if the self-interference duration is still not over.

In another example, there can be a newly defined control frame which can achieve the same effect.

According to one embodiment, when the receiver has a self-interference issue and the transmitter can detect the interference issue (e.g., because the receiver is close to the transmitter and the receiver's signal strength from the self-interference causing technology can be detected by the transmitter based on energy detection), then to react to the self-interference issue, the transmitter can perform a payload division with a gap based separation.

Figure 25:
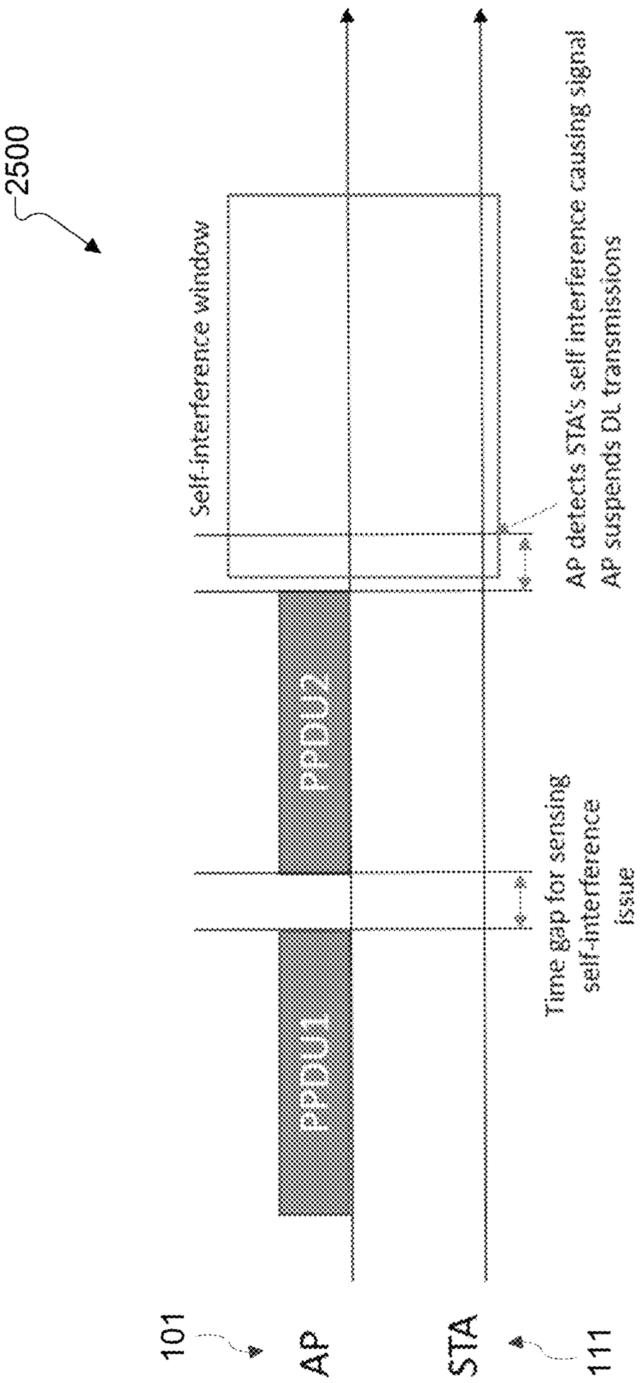
FIG. 25 illustrates an example operation in which a transmitter reacts to self-interference problem at the receiver side according to embodiments of the present disclosure.

FIG. 25 illustrates an example operation 2500 in which a transmitter reacts to self-interference problem at the receiver side according to embodiments of the present disclosure. In this example, the AP is the transmitter, and the STA is the receiver that experiences self-interference.

As illustrated in FIG. 25, the transmitter can divide the payload into multiple PPDUs and transmit each PPDU with a gap in between the PPDU transmissions. In the gap, the transmitter can try to detect if the self-interference issue exists at the receiver (e.g., based on energy detection), and if the transmitter detects the signal the transmitter can take an action to avoid further loss of resources (e.g., for the other PPDUs the transmitter can either drop the data rates to make them robust to the transmission or the transmission can terminate the TXOP earlier and end the transmission).

This procedure can also be used by the transmitter if there is self-interference from an internal radio and there is no way internally for the transmitter to find out about the interference and the transmitter needs to rely on sensing the signal over the air. This procedure can also be applied to other non-WI-FI technology (e.g., LAA) when the corresponding devices co-exist on the same channel.

When the AP MLD is a Mobile AP MLD, then there can be an additional issue that can arise due to the self-interference problem. Since in a Mobile AP MLD the non-primary link can only transmit or receive in synchronization with the primary link, if the non-primary link faces an interference issue from self-interference when the primary link gets TXOP, the non-primary link may not be able to transmit and the traffic that is mapped to the non-primary link can face an increase in delays. Further, if the interference issue is severe, the performance of the Mobile AP MLD can degrade to that of a single link device.

According to one embodiment, the Mobile AP MLD can change its link designation i.e., it can change the link that is designated as the primary link and the link that is designated as the non-primary link. If there are only two links, then the non-primary can become the primary link and the primary can become the non-primary link.

According to one embodiment, the Mobile AP MLD can transmit a frame to its associated non-AP MLDs to inform them of the change in the designation of the primary and the non-primary link. The frame transmitted by the Mobile AP MLD can contain one or more of the information items as indicated in Table 3.

TABLE 3

| Information item | Description |
|---|---|
| New primary link indicator | An information item to indicate the new primary link. E.g., the link id of the new primary link |
| New non-primary link indicator | An information item to indicate the new non-primary link. E.g., the link id of the new non-primary link. |
| Primary link designation time indicator | An information item to indicate the time at which the primary link designation occurs. E.g., this can be the TBTTs from the current TBTT when the designation change occurs, or this can be a list of timestamps when the designation change occurs. |
| Periodicity | An information item to indicate the periodicity of the link change if the Mobile AP intends to perform the link designation change periodically. E.g., periodicity indicated in terms of duration after which the link change will occur. |

The above information can be transmitted in an independent frame or in any of the frames in the standard (e.g., beacons). Such a frame can include a link designation change element.

Figure 26:
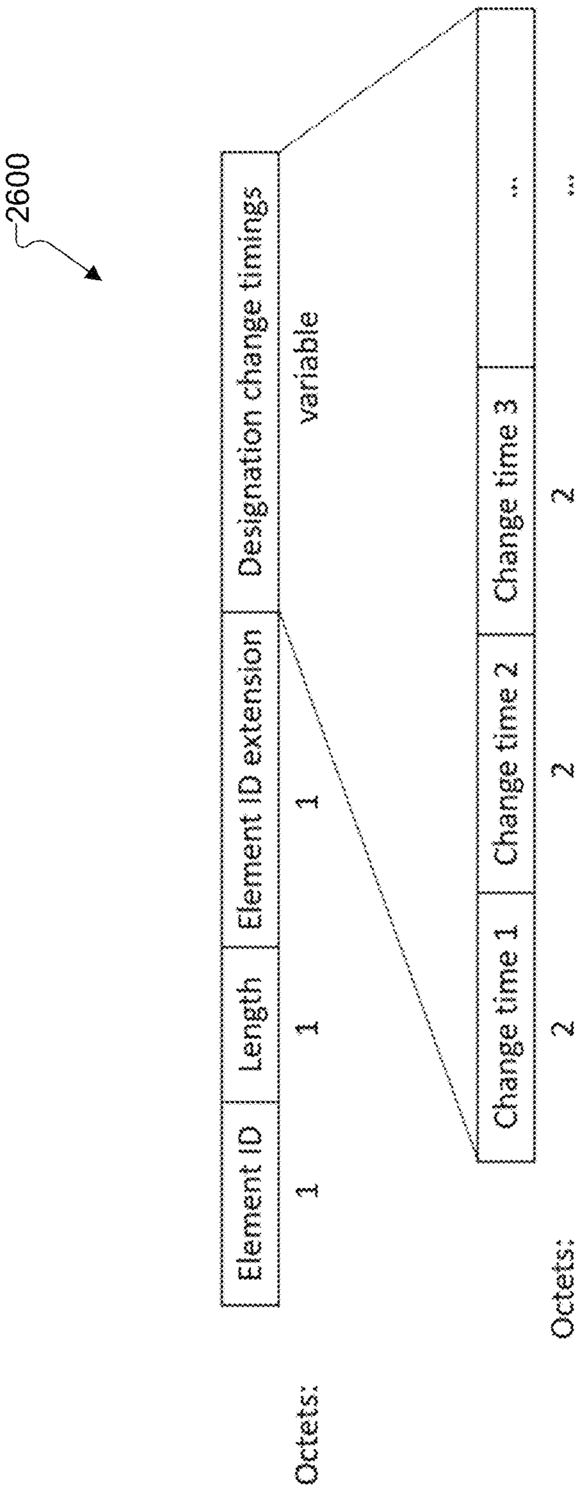
FIG. 26 illustrates an example format of a link designation change element according to embodiments of the present disclosure.

FIG. 26 illustrates an example format 2600 of a link designation change element according to embodiments of the present disclosure.

According to this embodiment, the Mobile AP MLD can perform link designation change to avoid the self-interference issue. The above information element can be present in beacons and can indicate the designation change(s) time before the next beacon transmission. Further, the designation change can be done on a short term scale between beacons or on a long term scale that covers multiple beacon intervals.

According to another example, the above information items of Table 3 can be carried inside the basic multi-link element. According to this embodiment, the Per-STA profile sub-element of the basic multi-link element can carry this information.

Figure 27:
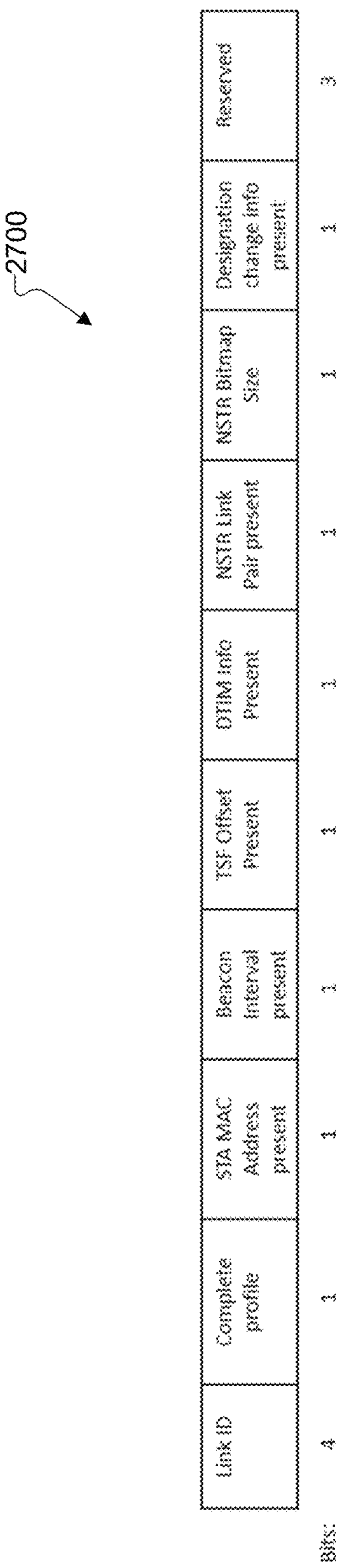
FIG. 27 illustrates an example format of a modified STA control field of the Per-STA profile sub-element of a basic multi-link element carrying link designation information according to embodiments of the present disclosure.

FIG. 27 illustrates an example format 2700 of a modified STA control field of the Per-STA profile sub-element of a basic multi-link element carrying link designation information according to embodiments of the present disclosure. The STA control field of the per-STA profile sub-element can carry a bit field (e.g., the designation change info present sub-field) that indicates the presence of designation change information. If this bit is set, then the STA info field of the basic multi-link element can carry the designation change timing information.

Figure 28:
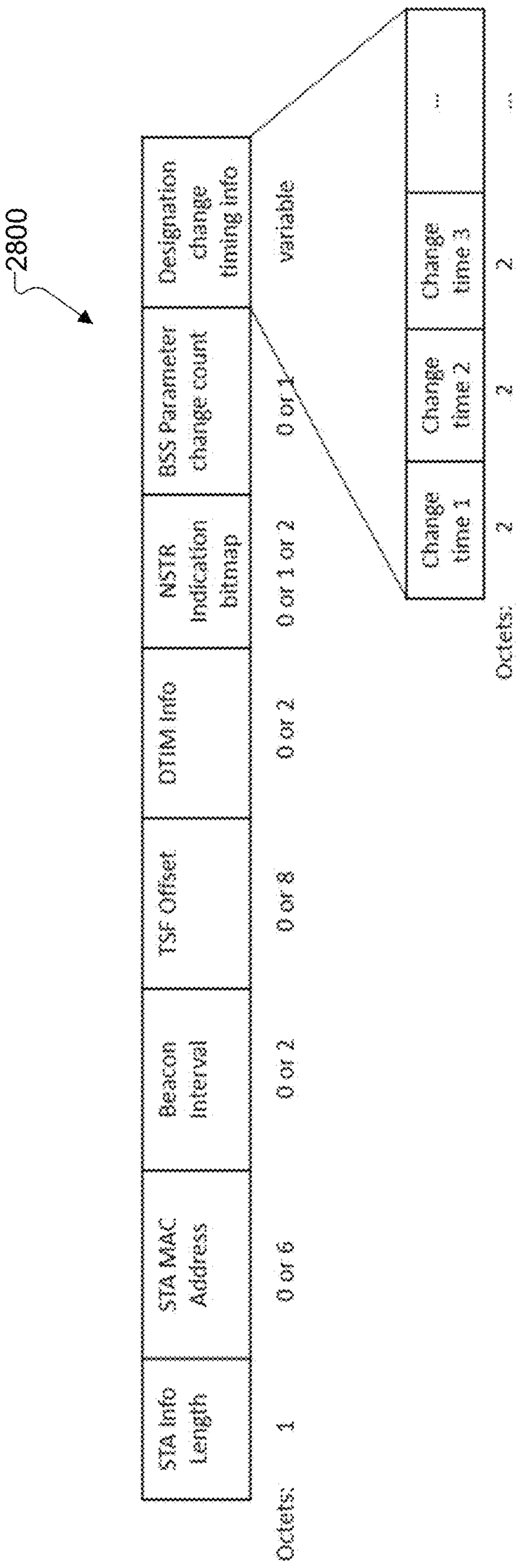
FIG. 28 illustrates an example format of a modified STA info field of the basic multi-link element carrying link designation information according to embodiments of the present disclosure.

FIG. 28 illustrates an example format 2800 of a modified STA info field of the basic multi-link element carrying link designation information according to embodiments of the present disclosure. The designation change timing info sub-field can carry the designation change timing information indicated when the designation change info present sub-field is set to 1 in the modified STA control field of FIG. 27.

According to one embodiment, if the AP is a Mobile AP MLD, then the AP can turn off the synchronization between the primary and the non-primary link to avoid chocking the non-primary link due to the synchronization constraint. The two links can transmit without tight synchronization and can perform medium synchronization recovery if they are NSTR link pairs as in the case of NSTR Mobile AP MLD. In such a case, the beaconing and probe request can still continue on the original primary link.

Instead of doing a designation change, the Mobile AP MLD can also perform a configuration change/switch (e.g., channel switch or swap between the primary and the non-primary link). Thus, the configuration (e.g., channel) of the primary can be assigned to the non-primary link and the configuration (e.g., channel) of the non-primary link can be assigned to the primary link. According to this embodiment, the Mobile AP MLD can transmit a frame to its associated non-AP MLDs containing one or more of the information items as indicated in Table 4.

TABLE 4

| Information item | Description |
|---|---|
| Link indication | An information item that can indicate the link for which this information corresponds to. E.g., link ID, link ID bitmap, etc. The indication can also be done implicitly by transmitting the frame on the link to which this information corresponds to. |
| Configuration indication | An information item that can indicate the new configuration for the link. E.g., channel configuration |
| Periodicity | An information item that can indicate the periodicity of the configuration change for the link. E.g., periodicity indicated in terms of duration after which the channel change will occur periodically. |
| Configuration change time | An information item that can indicate the time after which the configuration change can occur. E.g., a time after which the channel switch can occur. |

The above information of Table 4 can be present in a single frame or in multiple frames. The above information can be present in newly defined frames or in any of the frames existing in the standard (e.g., channel switch element or a modified channel switch element).

According to one embodiment, if AP-side supports power save mode, then AP can perform power save during the time when self-interference is expected. That way the AP can avoid self-interference issue and also conserve its power. The STA can do the same if the STA has power save capabilities and self-interference constraints.

According to one embodiment, the non-WI-FI technology can also consider modifications to its operations to avoid interference to WI-FI transmissions. In one embodiment, this can be done by considering WI-FI schedule. For instance, latency sensitive service periods of TWT or its variants (e.g., R-TWT) can be protected by non-WI-FI technology by avoiding causing an interference to such transmissions.

Figure 29:
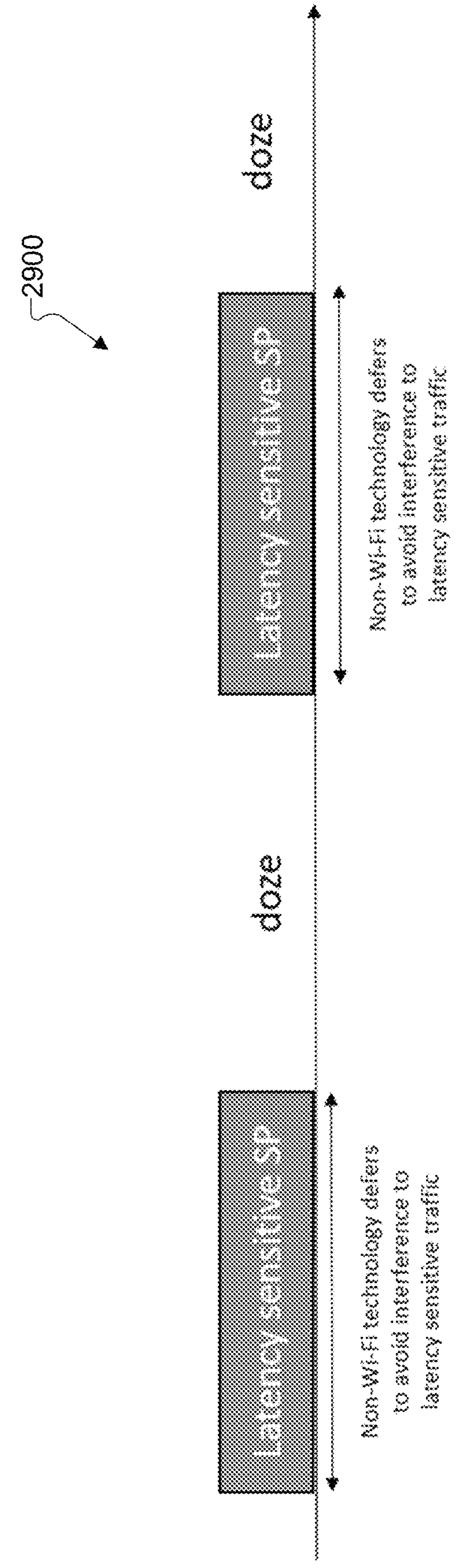
FIG. 29 illustrates an example timing diagram for an operation in which non-WI-FI technology protects WI-FI latency sensitive service periods according to embodiments of the present disclosure.

FIG. 29 illustrates an example timing diagram 2900 for an operation in which non-WI-FI technology protects WI-FI latency sensitive service periods according to embodiments of the present disclosure. In this example, the non-WI-FI technology protects the WI-FI latency sensitive service periods by deferring its transmissions when such service periods are ongoing.

In one example, if the non-WI-FI technology can perform energy detection and defer to WI-FI transmissions, then it can follow the quiet period of R-TWT service periods to provide protection to latency sensitive traffic.

Procedures and signaling described in this disclosure can also be used by the STA side to reduce the impact of self-interference when the non-WI-FI technology is running on the STA side. Procedures and signaling described in this disclosure can also be applied to other types of setups. E.g., P2P. The above procedures are not limited to self-interference and can be extended to any kind of interference from WI-FI (e.g., in the case of Multi-AP deployment) or from non-WI-FI (e.g., LAA).

Figure 30:
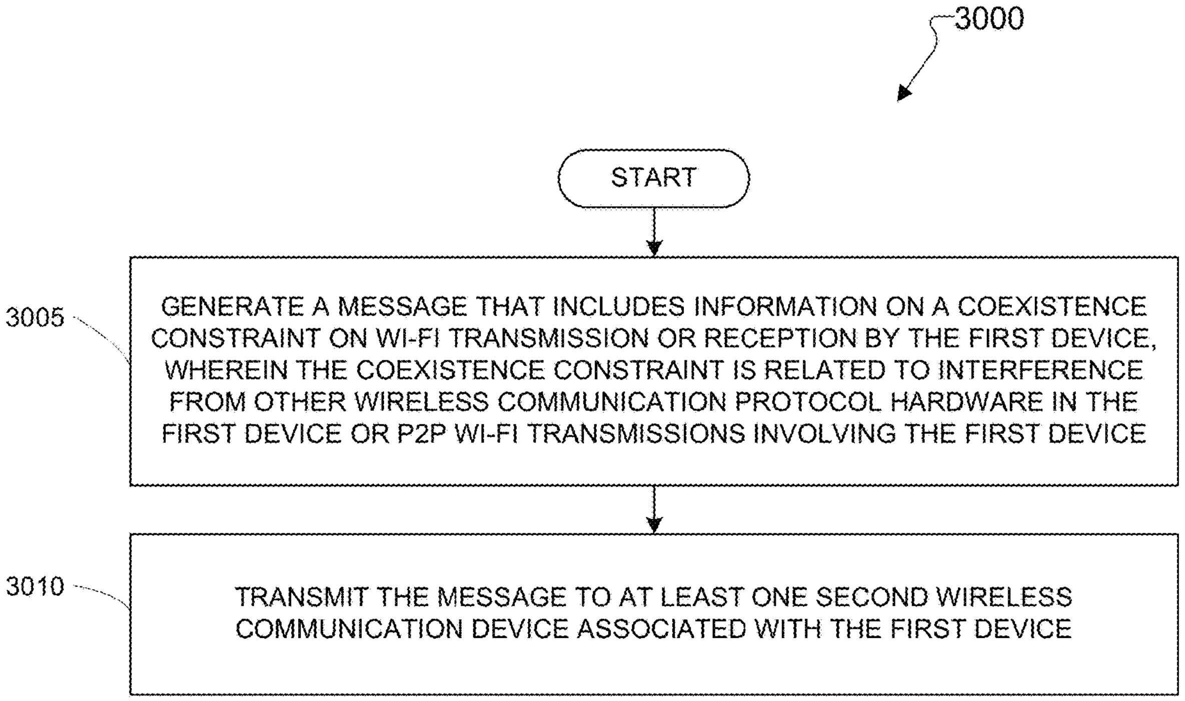
FIG. 30 illustrates an example process for facilitating mitigation of coexistence effects on WI-FI transmission or reception by co-located non-WI-FI technology radios or P2P WI-FI transmissions in a wireless communication device according to various embodiments of the present disclosure.

FIG. 30 illustrates an example process 3000 for facilitating mitigation of coexistence effects on WI-FI transmission or reception by co-located non-WI-FI technology radios or P2P WI-FI transmissions in a wireless communication device according to various embodiments of the present disclosure. The process 3000 of FIG. 30 is discussed as being performed by a first WI-FI device that can be either an AP or a STA, but it is understood that a corresponding second WI-FI device (e.g., a STA or an AP) performs a corresponding process. Additionally, for convenience the process of FIG. 30 is discussed as being performed by a WI-FI device that comprises a processor, a WI-FI transceiver, and other (non-WI-FI) wireless communication protocol hardware, however, it is understood that any suitable wireless communication device could perform this process.

Referring to FIG. 30, at step 3005 the first device generates a message that includes information on a coexistence constraint on WI-FI transmission or reception by the first device, wherein the coexistence constraint is related to interference from the other wireless communication protocol hardware in the first device or P2P WI-FI transmissions involving the first device.

The first device then transmits the message to at least one second wireless communication device associated with the first device (step 3010).

In various embodiments, the information on the coexistence constraint can include at least one of: an indication of whether the coexistence constraint is present, an indication of a wireless communication protocol that causes the coexistence constraint, an indication of a time when the coexistence constraint is expected to begin, an indication of an expected duration of the coexistence constraint, an indication of an interval between expected coexistence constraint occurrences, an indication of a link on which the coexistence constraint is expected to occur, an indication of an expected interference level caused by the coexistence constraint, and an indication of transmission configurations that can be used by the second device to configure its transmissions so they will overcome the coexistence constraint to be received at the first device.

In some embodiments, the information on the coexistence constraint includes parameters of a TWT schedule that indicate an SP and doze period for the TWT schedule. In one such embodiment the SP corresponds with time periods when the first device is unavailable for WI-FI transmission or reception due to the coexistence constraint, and the doze period corresponds with time periods when the first device is available for WI-FI transmission or reception. In another such embodiment the SP corresponds with time periods when the first device is available for WI-FI transmission or reception and the doze period corresponds with time periods when the first device is unavailable for WI-FI transmission or reception due to the coexistence constraint.

In one embodiment the message is a control frame and the information on the coexistence constraint includes one or more of an indication of whether the coexistence constraint is present, an indication of a link to which the information applies, an indication of an expected duration of the coexistence constraint, and an indication of a time when the coexistence constraint is expected to begin.

In one embodiment the information on the coexistence constraint includes rate adaptation guidance for the second device that indicates how the second device should manage its transmission rate for transmissions to the first device during the coexistence constraint.

In one embodiment the message includes information that allows the second device to adapt a payload of an ongoing transmission to account for the coexistence constraint. For example, the message may be an A-control subfield that includes at least one of an indication that the coexistence constraint is present, an indication of a remaining duration of the coexistence constraint, and an indication of a link to which the message applies. In this case, the first device transmits the A-control subfield to the second device during transmission of the payload by the second device.

In one embodiment an ongoing transmission from the second device is divided into multiple data units that are separated by a coexistence IFS, and the message is a notification frame that causes the second device to interrupt the ongoing transmission. In this case, the first device transmits the notification frame to the second device during a next coexistence IFS after the coexistence constraint begins.

In one embodiment the message causes the second device to refrain from transmitting to the first device for a duration of the coexistence constraint, and the first device transmits the message at a beginning of the coexistence constraint.

In one embodiment the first device is an AP, and the message is a quiet element that indicates quiet periods that coincide with periods when the coexistence constraint is expected.

In one embodiment the message indicates frequency resources on which the coexistence constraint exists and the second device refrains from transmitting to the first device using the indicated frequency resources.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a first wireless communication device, the method comprising:

generating a message that includes information on a coexistence constraint on wireless fidelity (WI-FI) transmission or reception by the first device, wherein the coexistence constraint is related to interference from other wireless communication protocol hardware in the first device or peer-to-peer (P2P) WI-FI transmissions involving the first device; and transmitting the message to a second device associated with the first device, wherein:

the message includes information that allows the second device to adapt a payload of an ongoing transmission to account for the coexistence constraint, the message is an A-control subfield that includes at least one of an indication that the coexistence constraint is present, an indication of a remaining duration of the coexistence constraint, and an indication of a link to which the message applies, and transmitting the message comprises transmitting the A-control subfield to the second device during transmission of a payload by the second device.

2. The method of claim 1, wherein the information on the coexistence constraint includes at least one of:

an indication of whether the coexistence constraint is present, an indication of a wireless communication protocol that causes the coexistence constraint, an indication of a time when the coexistence constraint is expected to begin, an indication of an expected duration of the coexistence constraint, an indication of an interval between expected coexistence constraint occurrences, an indication of a link on which the coexistence constraint is expected to occur, an indication of an expected interference level caused by the coexistence constraint, and an indication of transmission configurations that can be used by the second device to configure its transmissions so they will overcome the coexistence constraint to be received at the first device.

3. The method of claim 1, wherein:

the information on the coexistence constraint includes parameters of a target wake time (TWT) schedule that indicate a service period (SP) and doze period for the TWT schedule, and the SP corresponds with time periods when the first device is unavailable for WI-FI transmission or reception due to the coexistence constraint and the doze period corresponds with time periods when the first device is available for WI-FI transmission or reception, or the SP corresponds with time periods when the first device is available for WI-FI transmission or reception and the doze period corresponds with time periods when the first device is unavailable for WI-FI transmission or reception due to the coexistence constraint.

4. The method of claim 1, wherein the information on the coexistence constraint includes rate adaptation guidance for the second device that indicates how the second device should manage its transmission rate for transmissions to the first device during the coexistence constraint.

5. The method of claim 1, wherein:

the message causes the second device to refrain from transmitting to the first device for a duration of the coexistence constraint, and the method further comprises transmitting the message at a beginning of the coexistence constraint.

6. The method of claim 1, wherein:

the first device is an access point (AP), and the message is a quiet element that indicates quiet periods that coincide with periods when the coexistence constraint is expected.

7. The method of claim 1, wherein:

the message indicates frequency resources on which the coexistence constraint exists, and the second device refrains from transmitting to the first device using the indicated frequency resources.

8. A first wireless communication device comprising:

a wireless fidelity (WI-FI) transceiver;

other wireless communication protocol hardware; and a processor operably coupled to the WI-FI transceiver and the other wireless communication protocol hardware, the processor configured to generate a message that includes information on a coexistence constraint on wireless fidelity (WI-FI) transmission or reception by the first device, wherein the coexistence constraint is related to interference from the other wireless communication protocol hardware in the first device or peer-to-peer (P2P) WI-FI transmissions involving the first device, wherein:

the WI-FI transceiver is configured to transmit the message to a second device associated with the first device, the message includes information that allows the second device to adapt a payload of an ongoing transmission to account for the coexistence constraint, the message is an A-control subfield that includes at least one of an indication that the coexistence constraint is present, an indication of a remaining duration of the coexistence constraint, and an indication of a link to which the message applies, and the WI-FI transceiver is further configured to transmit the A-control subfield to the second device during transmission of a payload by the second device.

9. The first device of claim 8, wherein the information on the coexistence constraint includes at least one of:

an indication of whether the coexistence constraint is present, an indication of a wireless communication protocol that causes the coexistence constraint, an indication of a time when the coexistence constraint is expected to begin, an indication of an expected duration of the coexistence constraint, an indication of an interval between expected coexistence constraint occurrences, an indication of a link on which the coexistence constraint is expected to occur, an indication of an expected interference level caused by the coexistence constraint, and an indication of transmission configurations that can be used by the second device to configure its transmissions so they will overcome the coexistence constraint to be received at the first device.

10. The first device of claim 8, wherein:

the information on the coexistence constraint includes parameters of a target wake time (TWT) schedule that indicate a service period (SP) and doze period for the TWT schedule, and the SP corresponds with time periods when the first device is unavailable for WI-FI transmission or reception due to the coexistence constraint and the doze period corresponds with time periods when the first device is available for WI-FI transmission or reception, or the SP corresponds with time periods when the first device is available for WI-FI transmission or reception and the doze period corresponds with time periods when the first device is unavailable for WI-FI transmission or reception due to the coexistence constraint.

11. The first device of claim 8, wherein the information on the coexistence constraint includes rate adaptation guidance for the second device that indicates how the second device should manage its transmission rate for transmissions to the first device during the coexistence constraint.

12. The first device of claim 8, wherein:

the message causes the second device to refrain from transmitting to the first device for a duration of the coexistence constraint, and the WI-FI transceiver is further configured to transmit the message at a beginning of the coexistence constraint.

* * * * *